(12) United States Patent
Maeda et al.

(10) Patent No.: US 9,779,305 B2
(45) Date of Patent: Oct. 3, 2017

(54) VIDEO ANALYZING DEVICE, VIDEO ANALYZING METHOD, PROGRAM, AND INTEGRATED CIRCUIT

(71) Applicant: PANASONIC INTELLECTUAL PROPERTY CORPORATION OF AMERICA, Torrance, CA (US)

(72) Inventors: Kazuhiko Maeda, Osaka (JP); Tomohiro Konuma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 100 days.

(21) Appl. No.: 14/123,326

(22) PCT Filed: Apr. 3, 2013

(86) PCT No.: PCT/JP2013/002307
§ 371 (c)(1),
(2) Date: Dec. 2, 2013

(87) PCT Pub. No.: WO2013/150789
PCT Pub. Date: Oct. 10, 2013

(65) Prior Publication Data
US 2014/0093176 A1 Apr. 3, 2014

(30) Foreign Application Priority Data
Apr. 5, 2012 (JP) .................... 2012-086120

(51) Int. Cl.
*G06K 9/00* (2006.01)
*G11B 27/10* (2006.01)
*G11B 27/28* (2006.01)

(52) U.S. Cl.
CPC ........ *G06K 9/00744* (2013.01); *G11B 27/105* (2013.01); *G11B 27/28* (2013.01)

(58) Field of Classification Search
CPC ......... G06K 9/6215; G06K 2009/3291; G06K 9/4642; G06T 2207/10016; G06T 7/11;
(Continued)

(56) References Cited

U.S. PATENT DOCUMENTS 6,724,933 B1 * 4/2004 Lin .................... G06K 9/00711
345/591
6,928,233 B1 * 8/2005 Walker .............. G06F 17/30787
348/700

(Continued)

FOREIGN PATENT DOCUMENTS

JP 2005-277531 10/2005
JP 2007-42072 2/2007

(Continued)

OTHER PUBLICATIONS

International Search Report dated Jul. 2, 2013 in corresponding International Application No. PCT/JP2013/002307.

*Primary Examiner* — Chan Park
*Assistant Examiner* — Mai Tran
(74) *Attorney, Agent, or Firm* — Wenderoth, Lind & Ponack, L.L.P.

(57) ABSTRACT

A video analyzing device according to the present invention specifies an object-related section from video. The object-related section being related to a specific object appearing in the video. The video analyzing device includes an object-related section specifier that specifies a non-detected section as the object-related section when a predetermined condition is satisfied and does not specify the non-detected section as the object-related section when the predetermined condition is not satisfied. The object-detected section is a section in which the specific object is detected. The non-detected (Continued)

section is a section in which the specific object is not detected and which is in a consecutive relation with the object-detected section.

4 Claims, 25 Drawing Sheets

(58) Field of Classification Search
CPC ... G06T 1/0085; G06F 17/3028; G06F 3/012; H04N 19/176; H04N 21/44008; H04N 5/23219
See application file for complete search history.

(56) References Cited

U.S. PATENT DOCUMENTS

| | | | |
|---|---|---|---|
| 2005/0232588 A1 | 10/2005 | Hosoda et al. | |
| 2005/0257151 A1* | 11/2005 | Wu | G06F 17/30852 715/716 |
| 2007/0013791 A1 | 1/2007 | Kinoshita et al. | |
| 2007/0222884 A1* | 9/2007 | Mori | G11B 27/28 348/333.05 |
| 2007/0237360 A1 | 10/2007 | Irie et al. | |
| 2009/0262230 A1* | 10/2009 | Sugiura | G06F 3/0488 348/333.11 |
| 2010/0103279 A1* | 4/2010 | Shiratani | G06K 9/00228 348/222.1 |
| 2010/0104266 A1* | 4/2010 | Yashiro | G06K 9/00295 386/201 |
| 2010/0129047 A1* | 5/2010 | Tsunashima | H04N 5/44 386/278 |
| 2011/0007823 A1* | 1/2011 | Matsuo | G06K 9/00369 375/240.26 |
| 2011/0135152 A1* | 6/2011 | Kashiwagi | G06K 9/00261 382/103 |
| 2011/0188720 A1* | 8/2011 | Narayanan | G06K 9/20 382/131 |
| 2011/0273571 A1* | 11/2011 | Shimada | G06K 9/00261 348/207.99 |
| 2012/0057786 A1 | 3/2012 | Yano | |

FOREIGN PATENT DOCUMENTS

| | | |
|---|---|---|
| JP | 2007-281858 | 10/2007 |
| JP | 2009-123095 | 6/2009 |
| JP | 2009-201041 | 9/2009 |
| JP | 2010-50934 | 3/2010 |
| JP | 4830650 | 12/2011 |
| JP | 2012-54810 | 3/2012 |

* cited by examiner

FIG. 4

| Object-detected section ID | Object ID | Start-frame information ||||| End-frame information |||||
|---|---|---|---|---|---|---|---|---|---|---|---|
| | | Frame ID | X coordinate | Y coordinate | Length and width | Orientation | Frame ID | X coordinate | Y coordinate | Length and width | Orientation |
| 1 | 1 | 4 | 63 | 64 | 50 | 30° to left | 55 | 0 | 240 | 140 | Front |
| 2 | 2 | 60 | 170 | 180 | 160 | Front | 74 | 171 | 178 | 162 | Front |
| 3 | 1 | 78 | 0 | 250 | 130 | Front | 98 | 300 | 100 | 100 | Front |
| 4 | 3 | 92 | 322 | 138 | 66 | 30° to right | 133 | 150 | 141 | 91 | 30° to left and 30° downward |
| 5 | 1 | 113 | 292 | 34 | 109 | Front | 224 | 221 | 142 | 200 | Front |

FIG. 5

| Scene ID | Start frame ID | End frame ID |
|----------|----------------|--------------|
| 1 | 0 | 182 |
| 2 | 183 | 224 |
| ... | ... | ... |

FIG. 10

| Object-related section ID | Object ID | Start frame ID | End frame ID |
|---|---|---|---|
| 1 | 1 | 4 | 224 |
| 2 | 2 | 229 | 440 |
| 3 | 2 | 510 | 558 |
| ... | ... | ... | ... |

FIG. 12

| Frame ID | Displacement of entire image | |
|---|---|---|
| 55 | Vector 55 | |
| 56 | Vector 56 | ⎫ |
| 57 | Vector 57 | ⎬ Section in which object 1 is not detected |
| 77 | Vector 77 | ⎭ |
| 78 | Vector 78 | |

VIDEO ANALYZING DEVICE, VIDEO ANALYZING METHOD, PROGRAM, AND INTEGRATED CIRCUIT

TECHNICAL FIELD

The present invention relates to devices for analyzing video captured with digital cameras and the like by, for example, extracting sections in which specific objects appear.

BACKGROUND ART

The needs exist for a technology to extract, from video that the user owns, sections in which a specific object of interest (a specific person, for example) appears in order to browse and edit the extracted sections.

One method to meet the needs is to provide video with detection information, which is information about objects detected in the video, to facilitate easy extraction of sections in which the specific object appears.

Technologies to detect a specific person from video include a face detection technology, a human tracking technology based on an amount of change in the face region location computed from information about the face movements (see Patent Literature 1, for example), and a human tracking technology based on information about the torso region (see Patent Literature 2, for example).

CITATION LIST

Patent Literature

[Patent Literature 1]
Japanese patent application publication No. 2010-50934
[Patent Literature 2]
Japanese patent 4830650

SUMMARY OF INVENTION

Technical Problem

Unfortunately, general face detection technologies are limited by some factors, such as face orientations, and may fail to detect a target parson from video images. In particular, Patent Literature 1 cannot ensure detection and tracking of a target person in video images when the change in the face region location exceeds a predetermined amount. Also, Patent Literature 2 cannot ensure detection of a target person unless information about the torso regions is acquired.

As described above, a specific person A may not be detected from a video section despite that the person A actually appears in that video section. According to conventional technologies, a video section in which the person A appears but is not detected cannot be recognized as a video section related to the person A. In view of the above, it is noted that the users' needs mentioned above cannot be met merely by attaching detection information about a specific object only to the sections in which the specific object is detected.

In view of the above, the present invention aims to provide a video analyzing device for appropriately specifying video sections related to a specific object.

Solution to Problem

In order to solve the problems associated with conventional technologies, the present invention provides a video analyzing device for specifying an object-related section from video, the object-related section being related to a specific object appearing in the video, the video analyzing device including: an object-related section specifier that specifies a non-detected section as the object-related section when a predetermined condition is satisfied and does not specify the non-detected section as the object-related section when the predetermined condition is not satisfied. The object-detected section is a section in which the specific object is detected. The non-detected section is a section in which the specific object is not detected and which is in a consecutive relation with the object-detected section.

Advantageous Effects of Invention

The video analyzing device according to the present invention can appropriately specify video sections related to a specific object.

BRIEF DESCRIPTION OF DRAWINGS

FIG. 4 shows an example of information about object detection, tracking, and identification, the information being generated by the object detector 102, the object tracker 103, and an object identifier 104.

FIG. 5 shows an example of scene boundary information indicating boundaries between scenes in a video, the scene boundary information being generated by a scene detector 105.

FIG. 10 shows an example of information about object-related sections, the information being generated by an object-related section specifier 106.

FIG. 12 shows an example of information about motion blur in frames.

DESCRIPTION OF EMBODIMENTS

Findings Leading to Embodiments of the Present Invention

As described above, technologies for detecting and tracking objects have limitations. Therefore, when video sections in which a specific object appears are extracted, a video section in which the specific object actually appears but cannot be detected is failed to be extracted.

The person shooting video images (hereinafter, such a person is simply referred to as a "photographer") of a specific object (a specific person, for example) may not be able to keep the object within the camera frame at all times. For example, a specific person being a subject of the video may undergo a large movement. In such a case, the photographer may fail to follow the movement so that the specific person falls outside the camera frame. In another example, the photographer may shoot video images of a specific person while moving to a different position. In such a case, the photographer may undergo a large movement which causes the specific person to fall outside the camera frame. In a yet another example, a specific person being a subject of the video may fall outside the camera frame when the photographer intentionally directs the camera to a different object or scenery to shoot video images of the different object or scenery for a while before continuing to shoot video images of the specific person. Naturally, the specific person does not appear in the video sections taken while the specific person is located outside the camera frame. Therefore, such a section cannot be extracted as a section in which the specific person appears.

Consequently, when sections in which a specific person appears are extracted from video based on the detection information of objects to make a digest of the video, sections in which the specific person is not detected for the reasons stated above cannot be extracted. Therefore, the contents of the digest may be fragmentary. However, from users' standpoint, it is preferable to watch a video section composed of a sequence of frames captured for a specific object irrespective of that the object is not detected in some of the frames.

In view of the above, the present inventors have found that a video section in which a specific object is not detected (hereinafter, such a section may also be referred to as a "non-detected section") should be treated collectively as one section related to the object if the non-detected section is assumed to be in a consecutive relation with a section in which the object is detected (hereinafter, such a section may also be referred to as an "object-detected section").

Based on the above findings, the embodiments of the present invention aim to provide a video analyzing device that performs a process of specifying whether or not a section in which an object is not detected is a section related to the object.

Embodiment 1

The following describes a video analyzing device according to Embodiment 1 with reference to the drawings.

Figure 1:
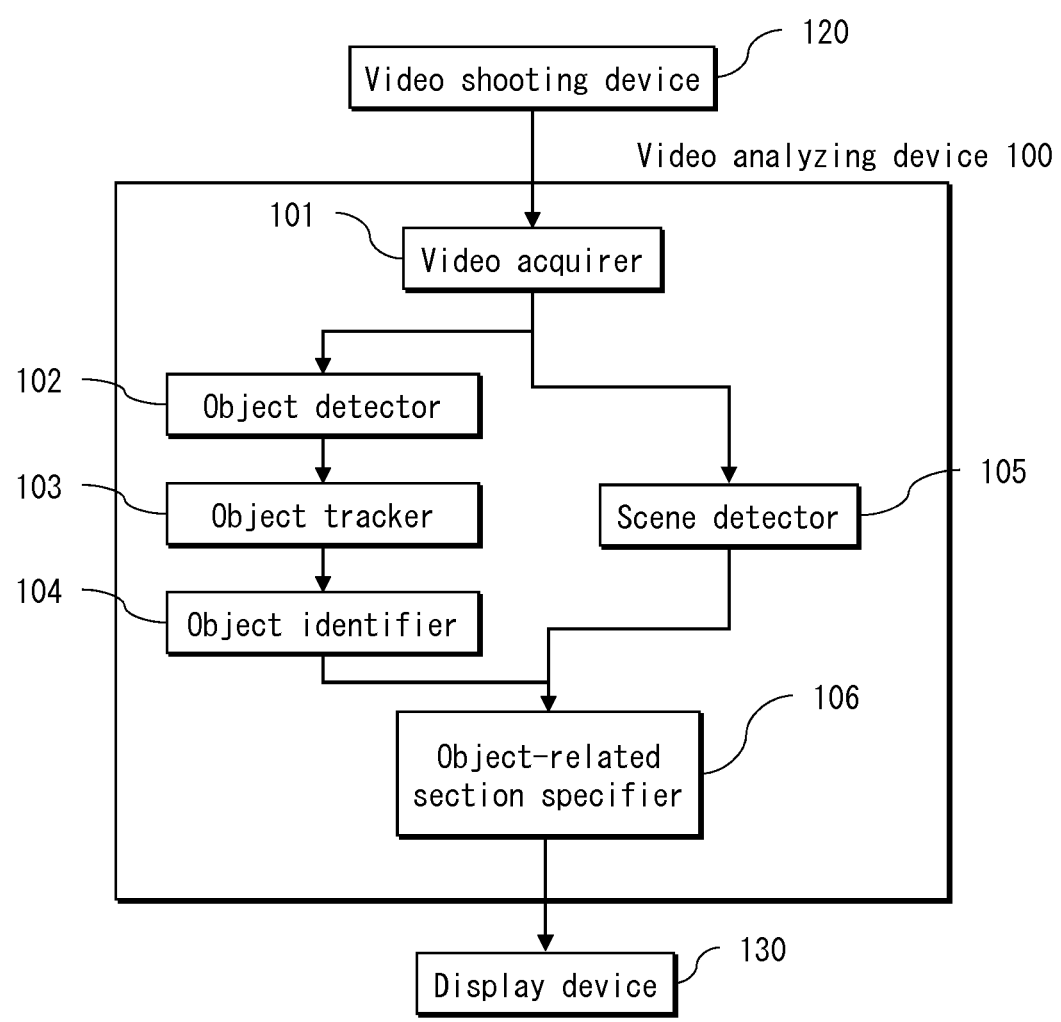
FIG. 1 is a functional block diagram of a video analyzing device 100 according to Embodiment 1.

FIG. 1 is a functional block diagram of a video analyzing device 100 according to Embodiment 1.

The video analyzing device 100 is connected to a video shooting device 120 and a display device 130.

The video shooting device 120 has the functionality of shooting and storing video. In one example, the video shooting device 120 is composed of a digital movie camera. The video analyzing device 100 is connected to the video shooting device 120 via a universal serial bus (USB), for example.

The display device 130 has the functionality of displaying video that is output from the video analyzing device 100. The display device 130 is composed of a digital television receiver, for example. The video analyzing device 100 is connected to the display device 130 via a high-definition multimedia Interface™ cable (HDMI), for example.

Next, the internal configuration of the video analyzing device 100 is described.

As shown in FIG. 1, the video analyzing device 100 includes a video acquirer 101, an object detector 102, an object tracker 103, an object identifier 104, a scene detector 105, and an object-related section specifier 106.

The video acquirer 101 acquires video stored on the video shooting device 120. The video acquirer 101 is composed, for example, of a USB port for insertion of a USB cable and software for controlling an interface, such as a USB driver.

The object detector 102 detects objects from frames of a video acquired by the video acquirer 101. Examples of objects to be detected include a human face, animals, such as cats and dogs, vehicles, buildings, and so on.

The object tracker 103 performs a process of tracking each object detected by the object detector 102. In particular, the object tracker 103 tracks the respective objects by confirming where each object detected in one frame is located in the subsequent frame.

The object identifier 104 performs a process of identifying the respective objects tracked by the object tracker 103. In particular, the object identifier 104 identifies whether an object tracked in one video section is the same object as any object tracked in another video section.

The scene detector 105 detects boundaries between scenes of the video acquired by the video acquirer 101.

The term "scene" refers to a section composed of a sequence of semantically correlated frames or of a sequence of consecutively recorded frames. For example, from a video taken at a sports meeting, the scene detector 105 detects a section representing the opening ceremony as one scene and a section representing a footrace as another scene.

The object-related section specifier 106 specifies object-related sections for the respective objects identified by the object identifier 104, from among sections of the video. Note that the object-related section specifier 106 specifies, as an object-related section for an object, sections in which that object is detected as well as sections estimated to be related to that object. The details of the object-related section specifier 106 are described later.

The object detector 102, the object tracker 103, the object identifier 104, the scene detector 105, and the object-related section specifier 106 are each composed of: memory, such as ROM, storing a program for the related process; a CPU executing the program; memory, such as RAM, for loading program data; and so on.

Figure 2:
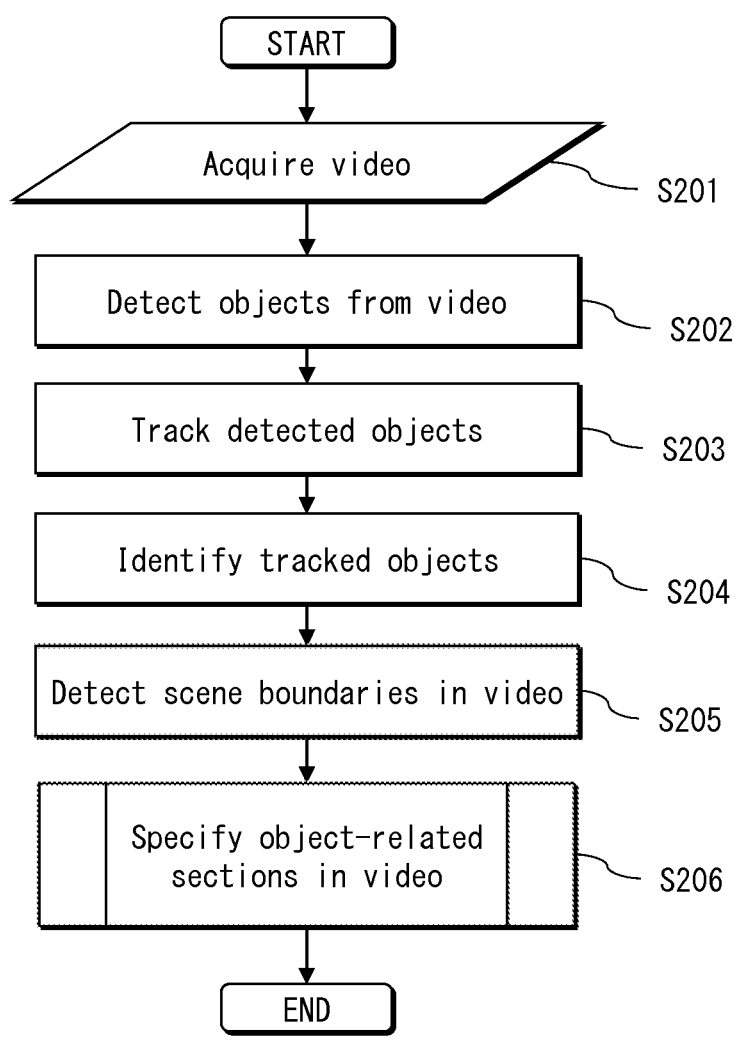
FIG. 2 is a flowchart of the overall operation of the video analyzing device 100 according to Embodiment 1.

With reference to the flowchart shown in FIG. 2, the overall operation of the video analyzing device 100 is described.

First, the video acquirer 101 acquires a video stored on the video shooting device 120 (S201).

Next, the object detector 102 detects objects from the respective frames of the acquired video (S202).

Figure 3:
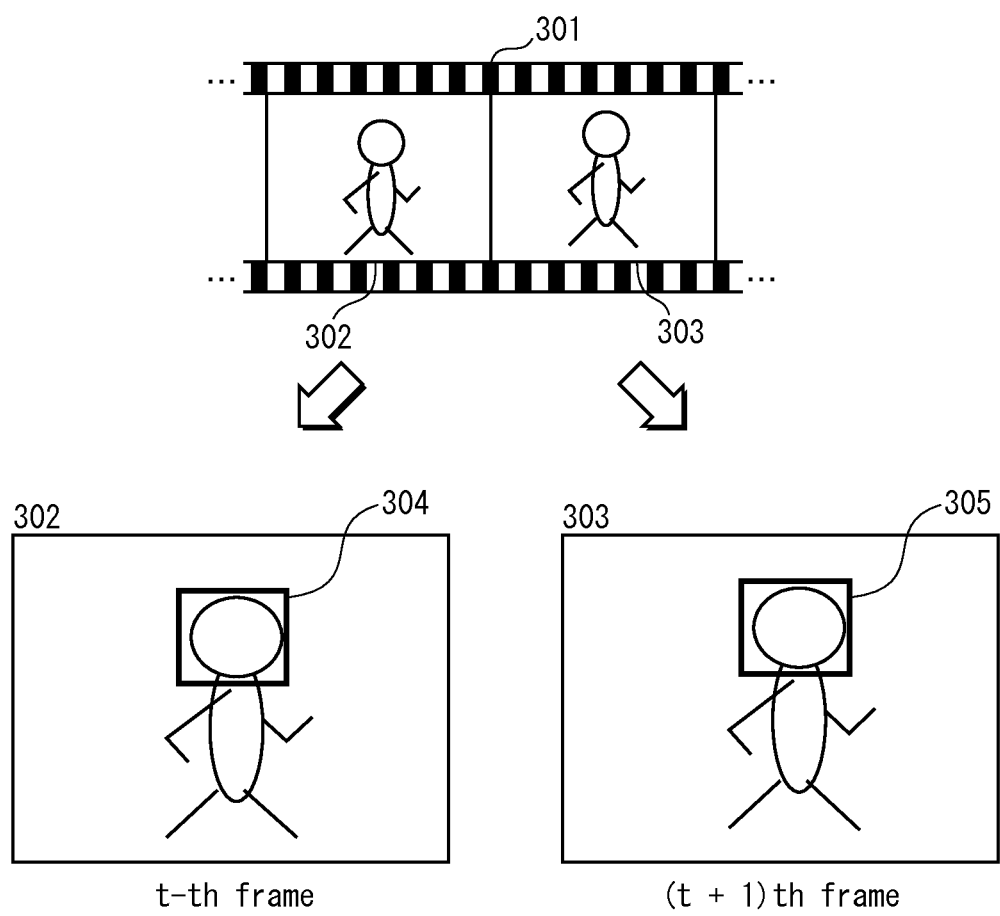
FIG. 3 illustrates an example of object detection by an object detector 102 and an example of object tracking by an object tracker 103.

With reference to FIG. 3, Step S202 is described in detail. In the example illustrated in FIG. 3, a human face is detected as an object.

In FIG. 3, the reference sign 301 denotes the video acquired, 302 denotes the t-th frame of the video 301, and 303 denotes the (t+1)th frame of the video. The object detector 102 acquires a plurality of frames, including frames 302 and 303, from the video 301 and detects a human face as an object from the frames thus acquired.

One example of a scheme for detecting an object is to crop a region bounding the object from each frame, with reference to a face dictionary provided in advance. When this scheme is employed in the example of FIG. 3, a region bounding an object 304 is cropped from the frame 302, and a region bounding an object 305 is cropped from the frame 303. In this way, the objects 304 and 305 are each detected as a human face.

Next, the object tracker 103 tracks the respective objects detected from the respective frames of the video (S203).

One example of a scheme to track objects is to identify two objects detected in two consecutive frames as one and the same object when the detection regions of the respective objects (i.e., regions bounding the respective objects) are located at the same or substantially the same position in the frames. When this scheme is employed in the example of FIG. 3, the detection region of the object 304 in the frame 302 is located at the substantially same position as the detection region of the object 305 in the frame 303. Consequently, the object tracker 103 identifies the objects 304 and 305 as the same object and tracks the object 304 (305) in a sequence of frames 302-303.

The object identifier 104 performs a process of identifying the respective objects tracked by the object tracker 103 (S204). In particular, the object identifier 104 identifies whether any object tracked in one video section is the same object as any object tracked in another section.

In one example of a scheme to identify objects, a first step is to extract image features of objects being tracked from an arbitrary one of the frames of the object-detected sections in which the respective objects are tracked by the object tracker 103. Then, objects being tracked are identified as the same object if the image features extracted for the respective objects are similar.

The scheme to identify objects is not limited to the one described above. In another scheme, for example, the image features of a specific object may be registered in advance and compared with the image features extracted for each object being tracked in the respective sections subjected to the tracking. Through the comparison, the specific object can be identified.

The term "image features" refers to features representing a distribution of pixel values held by the respective pixels in an image. In one example, the image features is a vector of numeric values representing features of the image. Image features include the frequency and orientation representations of the pixel values in image data obtained as a Gabor filter output. In the case of image features related to a human face, the components of the vector can be numeric values such as the distance between two points detected as the eyes or the distance between the points detected as the nose and the mouth based on the frequency and orientation representations of the pixel value distribution.

FIG. 4 shows an example of information about object detection, tracking, and identification generated in Steps S202-S204 described above. The information about object detection, tracking, and identification may be stored in a storage unit provided in the video analyzing device 100 or in an external storage unit accessible by the video analyzing device 100.

In FIG. 4, the information about object detection, tracking, and identification includes object-detected section information for each object appearing in the video, object ID information for identifying objects detected in the respective object-detected sections, and start- and end-of-frame information showing the start and end frames of each object-detected section. The start- and end-of-frame information of each object-detected section includes: frame ID information, detection region information showing a region bounding the object identified by the object ID information; and orientation information showing the orientation of the object. In the example shown in FIG. 4, the detection region information for a detected object defines a rectangle region bounding the object within the entire frame region, by describing the coordinates of the top left pixel of the rectangle region and the width and length of the rectangle region.

With reference back to FIG. 2, a further description is given.

The scene detector 105 detects scene boundaries in the video acquired by the video acquirer 101 (S205).

One example of a scheme to detect scene boundaries is based on change in image information between consecutive frames.

The image information refers to hues and luminance. For example, the scene detector 105 detects a boundary between two consecutive frames as a scene boundary when the change between the two consecutive frames in image information relevant to the entire frame region is greater than a predetermined level. The scheme to detect scene boundaries is not limited to the one described above. For example, scene boundaries may be detected based on change in audio information.

FIG. 5 shows an example of scene boundary information. Similarly to the information about object detection, tracking, and identification, the scene boundary information may be stored in a storage unit provided in the video analyzing device 100 or in an external storage unit accessible by the video analyzing device 100.

In the example shown in FIG. 5, the scene boundary information includes, for each scene in the video, scene ID information identifying the scene and frame information showing the frames being the start and end frames of the scene.

Next, the object-related section specifier 106 specifies object-related sections in the video, based on the information related to detection, tracking, and identification generated in Steps S202-S204 and the scene boundary information generated in Step S205 (S206).

Figure 6:
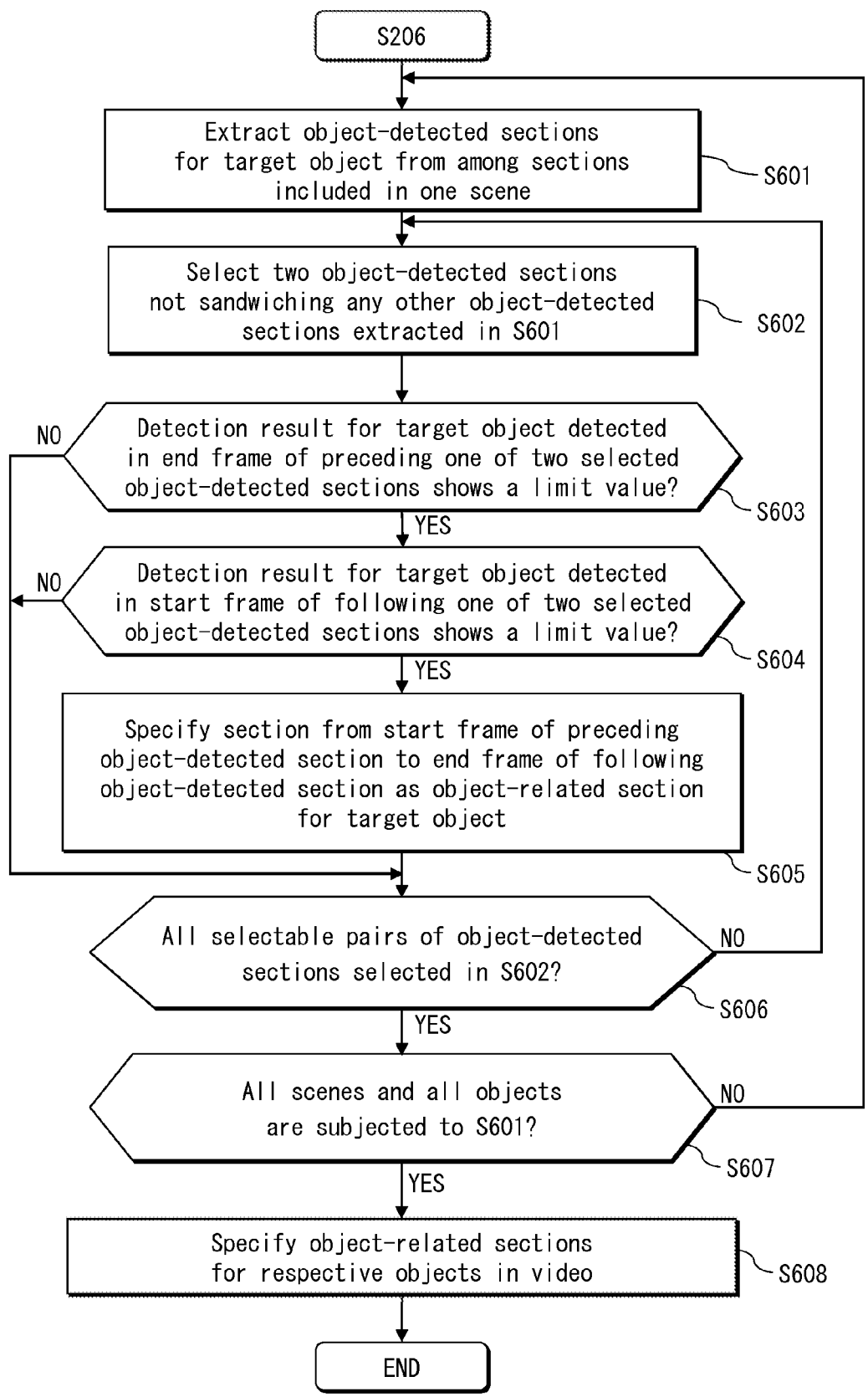
FIG. 6 is a flowchart of a process of specifying an object-related section according to Embodiment 1.

With reference to the flowchart in FIG. 6, Step S206 is described.

First, the object-related section specifier 106 extracts object-detected sections on a scene-by-scene basis (S601). The object-detected sections to be extracted in this step are sections which are included in the same scene and in which objects identified as the same object by the object identifier 104 are detected (hereinafter, this object is referred to as the "target object"). In Step S601, as long as at least part of a section to be extracted is included in a scene, the section is regarded as being included in that scene.

The following specifically describes Step S601 with reference to FIGS. 4 and 5.

In FIG. 5, scene 1 is composed of a sequence of frames, namely from frame 0 to frame 182. With reference to FIG. 4, it is thus known that scene 1 contains object-detected sections 1-5. Note that object-detected section 5 is composed of a sequence of frames from 113 to 224, which means that object-detected section 5 is partly included in scene 1. Therefore, object-detected section 5 is duly regarded as being included in the same scene as object-detected sections 1-4.

From among objects detected in object-detected sections 1-5, objects detected in the object-detected sections 1, 3, and 5 are identified as the same object (target object), which in this case is object 1. Consequently, the object-detected sections 1, 3, and 5 are extracted in Step S601.

Next, the object-related section specifier 106 selects two of the object-detected sections extracted in Step S601 in a manner that any other object-detected section extracted in Step S601 is not placed between the two selected object-detected sections (S602).

The following specifically describes Step S602 with reference to FIG. 4.

Suppose that the object-detected sections 1, 3, and 5 shown in FIG. 4 are selected in Step S601. From among the object-detected sections 1, 3, and 5, pairs not sandwiching any other object-detected section extracted in Step S601 are a pair of object-detected sections 1 and 3 and a pair of object-detected sections 3 and 5. Accordingly, the pair of object-detected sections 1 and 3 or 3 and 5 is selected in Step 602. Note that the pair of object-detected sections 1 and 5 is not selectable because the object-detected section 3 is present between the object-detected sections 1 and 5.

Next, the object-related section specifier 106 checks whether or not the detection result shows that the target object detected in the end frame of the preceding one of the two object-detected sections selected in Step S602 meets any limit value (S603). Note that the preceding object-detected section refers to the one of the two object-detected sections that is prior to the other in time sequence.

The term "limit value" refers to a value determined by the object detector 102 and indicating the limit of a range within which an individual object is detectable. The following describes examples of the limit values.

Suppose, for example, that the object to be detected is a human face. Generally, detectable human faces are limited by the face orientations, sizes, frame coordinates (i.e., coordinates within a frame), and so on.

Figure 7:
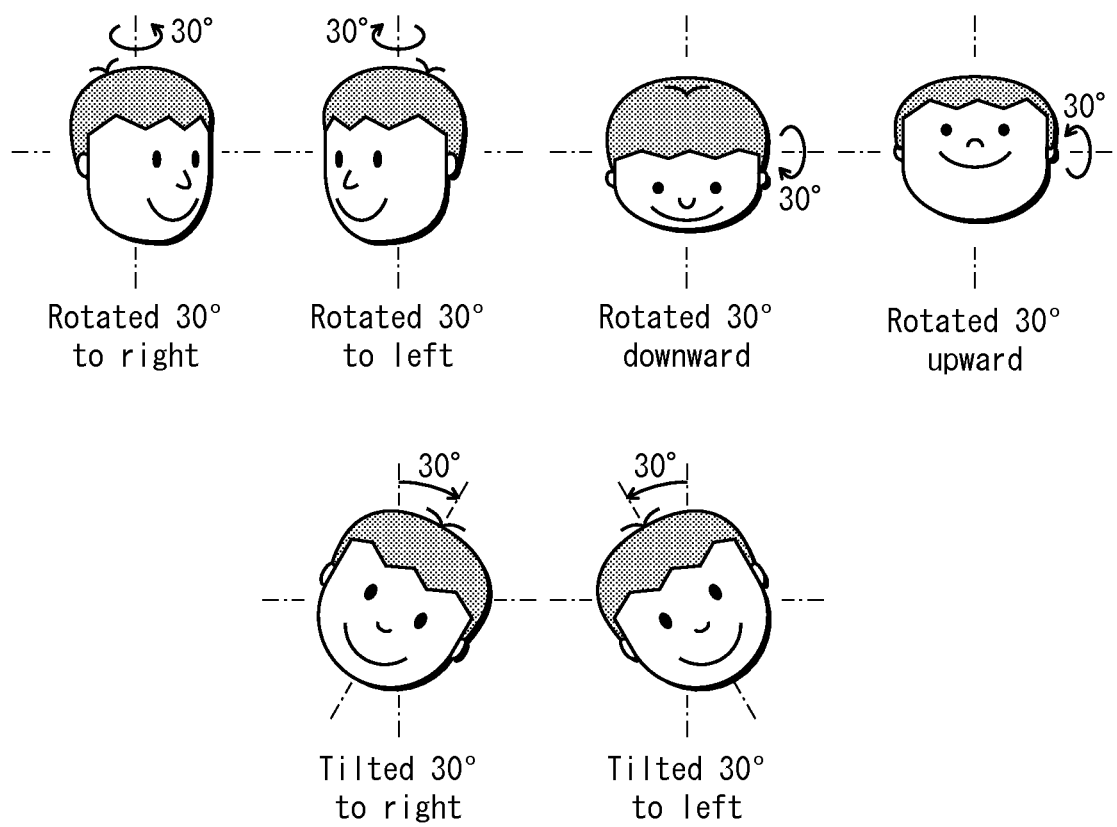
FIG. 7 shows one example of face orientations detectable by the object detector 102.

First of all, reference is made to FIG. 7 to describe the limit value regarding the "orientations" of a human face. Human faces which may appear in video are not limited to the frontal views. Rather, the face orientations including the one looking up, down, right, or left may appear. Suppose that the face orientations detectable by the object detector 102 are limited to faces rotated or tilted up to 30 degrees on the respective rotation axes, as shown in FIG. 7. In this case, the object detector 102 cannot detect any face rotated or tilted to a greater angle. Thus, the "limit value" for the face "orientations" is determined to be "30 degrees on the respective rotation axes".

Note that the limit value of a detectable range by the object detector 102 is not limited to the specific example shown in FIG. 7. For example, the detectable face orientations may differ depending on the size of a human face image. In such a case, the limit values may be set in association with various sizes of a human face image.

The following now describes the limit value regarding the "size" of a human face image. Suppose, for example, that the size of a human face image detectable by the object detector 102 is limited to 35 pixels at minimum and 200 pixels at maximum. In this case, a human face image corresponding to less than 35 pixels or more than 200 pixels is not detectable. Thus, the limit values for the "size" of a human face image are determined to be "35 pixels" and "200 pixels".

Figure 8:
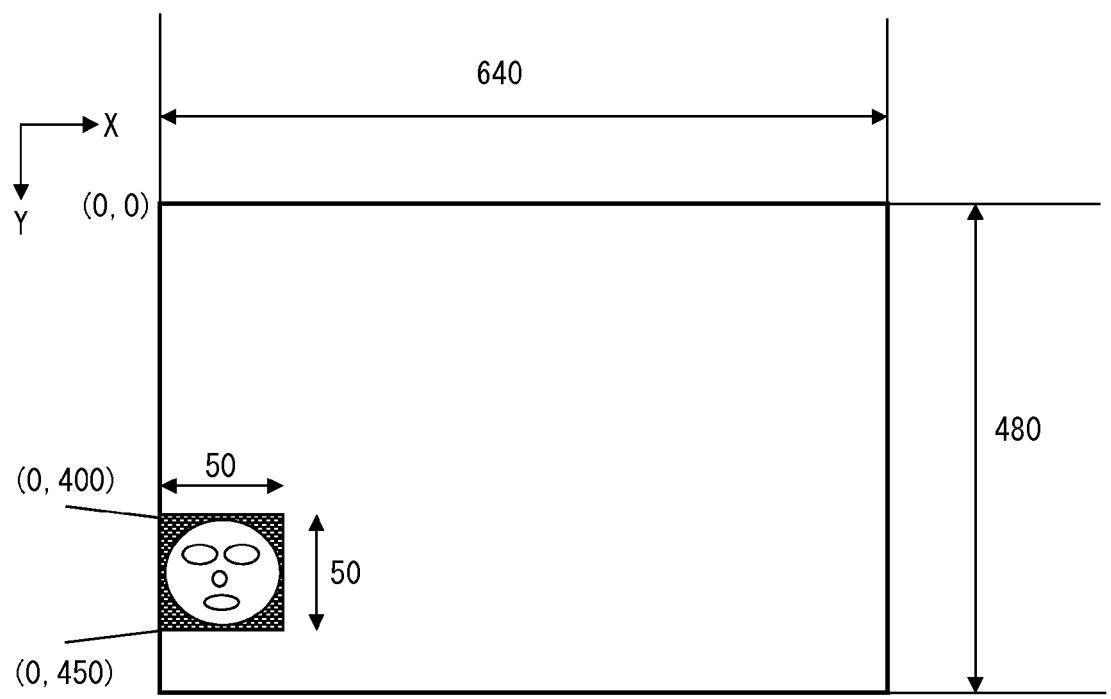
FIG. 8 shows one example of a detection region of an object detectable by the object detector 102.

Next, reference is made to FIG. 8 to describe the limit values regarding the "frame coordinates". Suppose, for example, that the frame size is 640×480 and that the rectangle region bounding a face detected by the object detector 102 is described by (x1, y1, wh1), where x1 and y1 respectively denote the X and Y coordinates of the top left pixel of the rectangle region, and wh1 denotes the length and width of the rectangle region. When the rectangle region bounding a human face is in contact with an edge of the frame, the rectangle region is located at a detectable limit. When the entire image of a face is not within the frame, in other words, when only a portion of the face appears in the frame, such a human face is not detectable. In this case, the limit values regarding the "frame coordinates" are determined to be: 0, which is equal to the minimum value of x1; 640, which is equal to the maximum value of (x1+wh1); 0, which is equal to the minimum value of y1; and 480, which is equal to the maximum value of (y1+wh1). In the example shown in FIG. 8, the rectangle region bounding the detected human face is described by (x1, y1, wh1)=(0, 400, 50). The rectangular region is in contact with an edge of the frame, and therefore x1=0. That is to say, the detection result shows that the detected human face meets the limit value.

In Step S603 as well as in Step S604, which will be described below, of Embodiment 1, the object-related section specifier 106 checks whether the detection result shows that the detected target object meets any limit value. However, these steps are described merely as an example and without limitations. Alternatively, it is applicable to check whether the detection result shows that the detected target object is within a predetermined range from the limit value(s). In other words, it is applicable to check whether or not the detected target object falls within a numerical range determined based on the detectable limits of objects.

For example, regarding the "frame coordinates", the object-related section specifier 106 may check whether the detection region of the target object is located within a predetermined region extending from an edge of the frame. In other words, it is applicable to check whether or not the detection region is located near the edge of the frame.

Note that the predetermined region extending from the edge of the frame may be set according to the frame size. For example, consider the frame size of 640×480. In this case, the predetermined region may be a peripheral region composed of 32 pixels from the top and bottom edges and 24 pixels from the right and left edges. Note that 32 pixels correspond to 5% of the entire frame width (640 pixels), whereas 24 pixels correspond to 5% of the entire frame height (480 pixels). In this example, the object-related section specifier 106 checks whether or not the detection region of the target object satisfies one or more of the following conditions: 0<x1<32; (640−wh1−32)<x1<(640−wh1−32); 0<y1<24; and (480−wh1−24)<y1<(480−wh1).

Regarding the "face orientation", the object-related section specifier 106 may check whether or not the target object is oriented at an angle within a predetermined range from the limit value. The predetermined range of orientation may be set according to the detection accuracy of the object detector 102. For example, when the limit value is set to 30 degrees with respect to each rotation axis shown in FIG. 7, the predetermined range may be determined to be a range of 28 degrees (=the limit value 30 degrees−5% of 30 degrees≈2 degrees) to 30 degrees.

When the object-related section specifier 106 determines in Step S603 that the detection result shows that the target object detected in the end frame of the preceding one of the two selected object-detected sections meets any of the limit values (S603: YES), the processing moves onto Step S604. If not (S603: NO), the processing moves onto Step S606.

In Step S604, the object-related section specifier 106 now checks whether or not the detection result shows that the target object detected in the start frame of the following one of the two object-detected sections selected in Step S602 meets any limit value. Note that the following object-detected section refers to the one of the two object-detected sections that is after the other in time sequence. When the detection result of the target object meets any limit value (S604: YES), the object-related section specifier 106 specifies that each of the two object-detected sections as well as the non-detected section present between the two object-detected sections is an object-related section for the target object (S605). In other words, in Step S605, the section from the start frame of the preceding one of the two object-detected sections to the end frame of the following one of the two object-detected sections is specified as one object-related section for the target object. When the detection result of the target object does not to meet any limit value (S604: NO), the object-related section specifier 106 moves onto Step S606.

Figure 9:
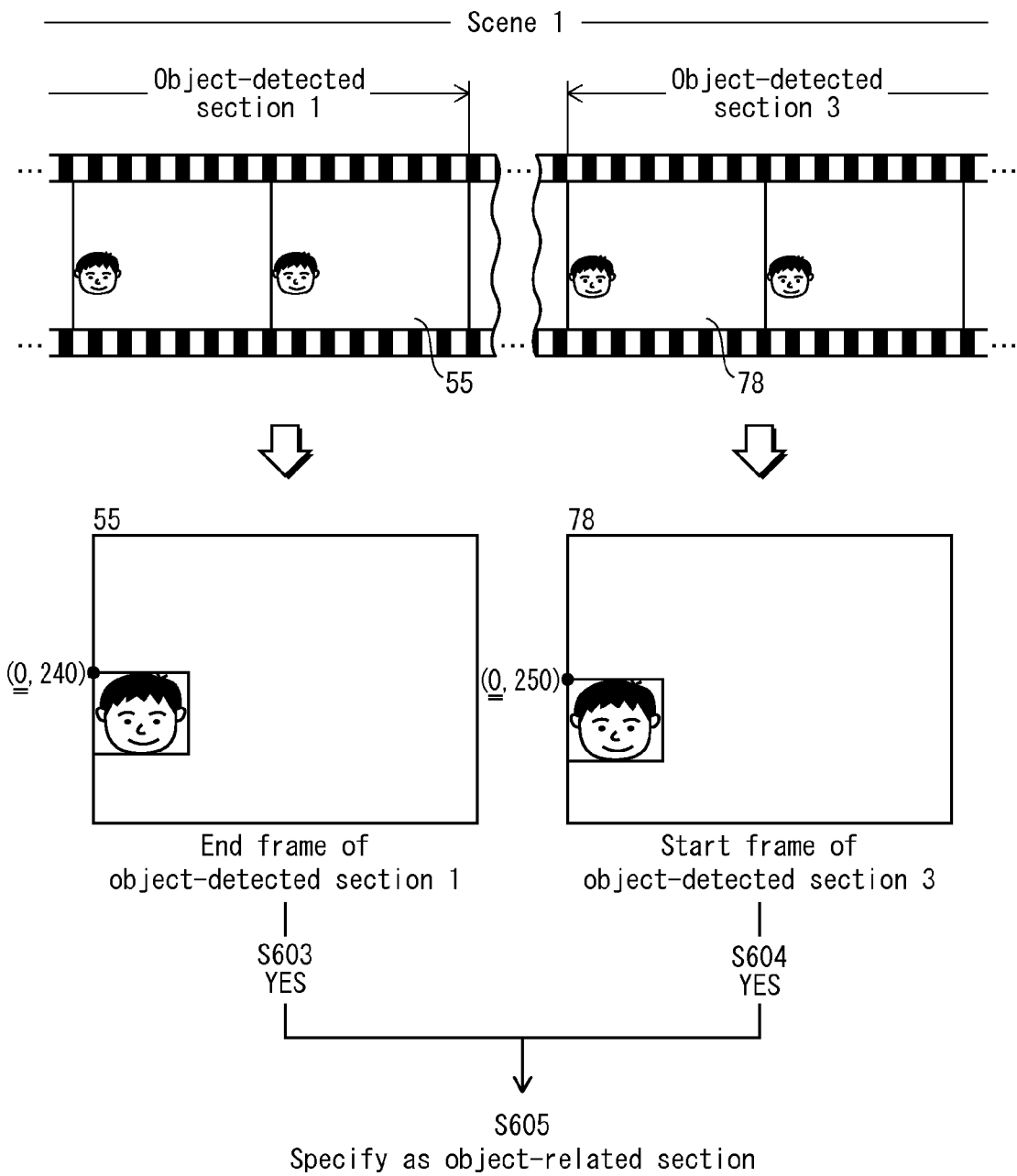
FIG. 9 illustrates a process of specifying an object-related section according to Embodiment 1.

Now, a specific description of Steps S603 and S604 is given with reference to FIGS. 4 and 9. Suppose, for example, that the object-detected sections 1 and 3 are selected as the two object-detected sections in Step S602. Of the two object-detected sections, the one prior to the other in time sequence is object-detected section 1 and the one after the other in time sequence is object-detected section 3. As shown in FIG. 9, frame 55 is the end frame of object-detected section 1, and frame 78 is the start frame of object-detected section 3. In addition, both the objects appearing in frames 55 and 78 are object 1 having the object ID 1 shown in FIG. 4. Object 1 is the target object to be processed in Steps S603 and S604. Suppose that the object-related section specifier 106 has set the limit values regarding the "frame coordinates" as described above.

Here, the top left pixel of the detection region of object 1 detected in the end frame of object-detected section 1 (frame 55) has the X coordinate equal to 0, which is the limit value (S603: YES). Consequently, the object-related section specifier 106 moves onto Step 604.

Next, in the start frame of object-detected section 3 (i.e., in frame 78), the top left pixel of the detection region of object 1 has the X coordinate equal to 0, which is the limit value (S604: YES). Therefore, the object-related section specifier 106 specifies the section from the start frame of object-detected section 1 (i.e., from frame 4) to the end frame of object-detected section 3 (i.e., to frame 98) as one object-related section for object 1.

In the case described above, the detection results of the target object detected in the end frame of the preceding one of the two object-detected sections and in the start frame of the following one of the two object-detected sections both meet a limit value. It is therefore assumed that the target object is not detected in the section present between the two object-detected sections because the target object falls out of the range detectable by the object detector 102.

Note that the specific example described above is directed, but not limited, to the case where the object-related section specifier 106 has set the limit value regarding the "frame coordinates". Instead of the limit value regarding the "frame coordinates", the limit values may be set regarding the face "orientation" or "size". In another example, the object-related section specifier 106 may set the limit values regarding two or more or all of the above-described conditions, namely "frame coordinates", face "orientations" and "sizes. In this case, the object-related section specifier 106 may check in Steps S603 and S604 whether or not the detection result of the target object in a relevant frame meets one or more of the limit values set for the respective conditions.

With reference back to FIG. 6, a further description is given.

In Step S606, the object-related section specifier 106 judges whether or not all the selectable pairs of object-detected sections have already been selected in Step S602. If all the selectable pairs have already been selected (S606: YES), the processing moves onto Step S607. If not (S606: NO), the processing goes back to S602.

In Step S607, the object-related section specifier 106 judges whether or not all the scenes and all the objects have already been subjected to the object section extraction in Step S601. If all the scenes and objects are already subjected to Step S601 (S607: YES), the processing moves onto Step S608. If not (S607: NO), the processing goes back to S601.

In Step S608, the object-related section specifier 106 determines object-related sections for the objects identified in Step S204, with reference to the results of Step S605.

FIG. 10 shows an example of object-related section information for the respective objects appearing in the video, as determined in Step S608. The object-related section information may be stored in a storage unit provided in the video analyzing device 100 or in an external storage unit accessible by the video analyzing device 100 and the display device 130.

In FIG. 10, the object-related section information includes ID information identifying each object-related section, an object ID information identifying a target object in the object-related section, and information about the start and end frames of the object-related section.

Now, a specific description of Step S608 is given with reference to FIGS. 4 and 10. Suppose that Step S605 specifies each of the following two sections as the object-related section for object 1: the section from the start frame of object-detected section 1 (i.e., from frame 4) to the end frame of object-detected section 3 (i.e., to frame 98); and the section from the start frame of object-detected section 3 (from frame 78) to the end frame of object-detected section 5 (to frame 224). In this specific example, it is also supposed that the object-detected sections 1, 3, and 5 are the only sections in which object 1 is detected.

Based on the results of specification made in Step S605, the object-related section specifier 106 determines in Step S608 that the section from the start frame of object-detected section 1 (i.e., from frame 4) to the end frame of object-detected section 5 (i.e., to frame 224) is one object-related section for object 1, as shown in FIG. 10. As described above, the object-related section specifier 106 specifies the object-related sections for the respective objects in Step S608 by organizing the results of specification made in Step S605.

Suppose, for example, that a user requests playback of a sequence of video images related to one specific object. In response, the display device 130 refers to object-related section information generated by the video analyzing device 100 for the respective objects appearing in the video to extract object-related sections for the requested object and plays back the extracted sections.

<Conclusion>

In the video analyzing device 100 according to Embodiment 1, the object-related section specifier 106 specifies that a non-detected section, which is a video section in which a target object is not detected, is an object-related section for the target object, provided that the conditions (1) and (2) below are both satisfied.

(1) The non-detected section and the object-detected sections, one immediately preceding and the other immediately following the non-detected section in time sequence, are all included in the same scene.

(2) The target object detected in the end frame of the preceding one of the object-detected sections and in the start frame of the following one of the object-detected sections both satisfy at least one of the limit conditions represented by the limit values for detection of the target object. The limit conditions represent the limits of a range in which the target object is detectable. Examples of the limit conditions include that: the target object is detected within a predetermined region in the end or start frame; the orientation of the target object is within a predetermined range; the size of the target object is within a predetermined range; and so on.

When the conditions (1) and (2) are both satisfied, the non-detected section is assumed, for example, to be: (i) a section in which the target object actually appears but is not detected due to the limitations of the object detection technologies; or (ii) a section in which the target object does not appear because the target object was out of the camera frame at the time of the video shooting as a result of a large motion of the object or photographer. With the video analyzing device 100 according to Embodiment 1, each section in which a target object is detected is managed as an object-related section for the target object. In addition, each section assumed to relate to the target object, as in the case of the sections (i) and (ii) above, is also managed as the object-related section for the target object. Therefore, it is ensured that the user can easily extract sections related to a specific object from video and that a video composed of the extracted sections is a desirable one for the user to watch.

Embodiment 2

In the description of the video analyzing device 100 according to Embodiment 1, the object-related section specifier 106 specifies object-related sections in a video based on the information about object detection, tracking, and identification and the scene boundary information. In particular, the video analyzing device 100 according to Embodiment 1 determines whether or not a non-detected section in which a specific object is not detected is an object-related section for the specific object. The determination is made by checking whether or not the object detected in each of the two frames in a consecutive relation with the non-detected section meets any limit value.

In Embodiment 2, a video analyzing device determines whether or not a non-detected section, which is a video section in which a specific object is not detected, is an object-related section by making a judgment regarding motion blur (or the acceleration of a video shooting device) in the non-detected section.

The following describes the video analyzing device according to Embodiment 2. The components and steps overlapping with those described in Embodiment 1 are denoted by the same reference signs and relevant description is omitted.

Similarly to the video analyzing device 100 according to Embodiment 1, the video analyzing device according to Embodiment 2 is connected to a video shooting device and a display device (FIG. 1). The functionality and so on of the video shooting device 120 and the display device 130 are similar to those described in Embodiment 1. Therefore, the description thereof is omitted.

The internal structure of the video analyzing device of Embodiment 2 is similar to that of the video analyzing device 100 (FIG. 1) described in Embodiment 1. Therefore, the description thereof is omitted. Yet, the specific processing performed by the object-related section specifier 106 of the video analyzing device according to Embodiment 2 differs from that described in relation to the video analyzing device 100 according to Embodiment 1. The detailed description is given later.

Next, the operation of the video analyzing device according to Embodiment 2 is described.

The video analyzing device according to Embodiment 2 first acquires a video (FIG. 2: S201), then detects, tracks, and identifies objects (S202-S204), and finally detects scene boundaries in the video (S205) in a manner similar to the video analyzing device 100 according to Embodiment 1. These steps are similar to those described in Embodiment 1 and therefore the description thereof is omitted.

Next, the object-related section specifier 106 of the video analyzing device according to Embodiment 2 specifies object-related sections based on the scene boundary information, in addition to the information about object detection, tracking, and identification (S206A). The specific processing performed in Step S206A differs from that performed in Step S206 of the Embodiment 1 described above.

Figure 11:
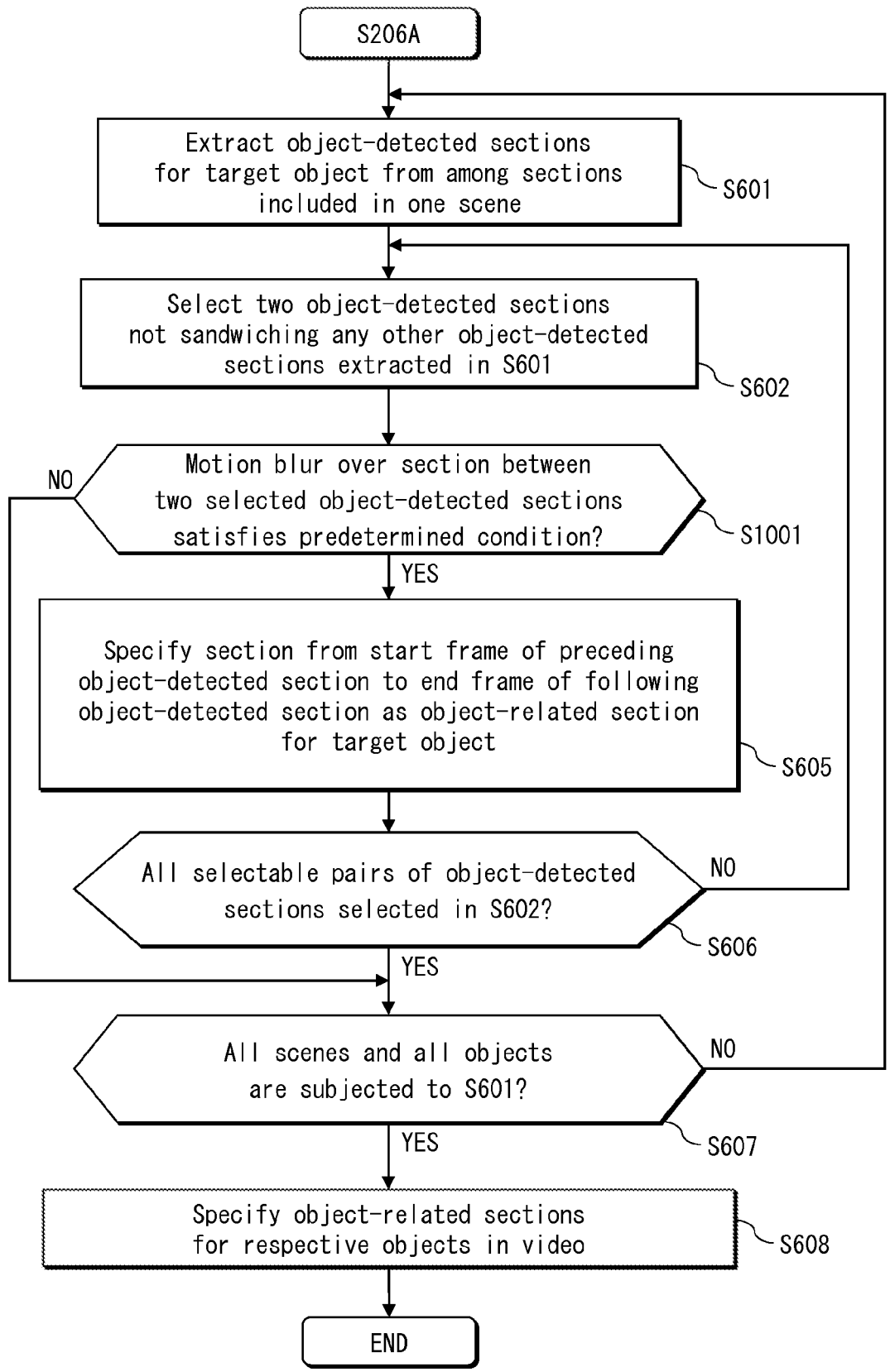
FIG. 11 is a flowchart of a process of specifying an object-related section according to Embodiment 2.

With reference to the flowchart in FIG. 11, Step S206A is described.

The processing performed in Steps S601 and S602 is the same as that described in Embodiment 1.

In Step S601, the object-related section specifier 106 extracts object-detected sections which are included in the same scene and in which objects identified as the same object by the object identifier are detected.

Next, in Step S602, the object-related section specifier 106 selects two of the object-detected sections extracted in Step S601 in a manner that any other object-detected section extracted in Step S601 is not placed between the two selected object-detected sections.

Next, the object-related section specifier 106 judges whether or not the motion blur in the non-detected section present between the two object-detected sections selected in Step S602 satisfies a predetermined condition (S1001). When the motion blur satisfies the predetermined condition (S1001: YES), the object-related section specifier 106 specifies that each of the two object-detected sections as well as the non-detected section present between the two object-detected sections is an object-related section for the target object (S605). In other words, in Step S605, the section from the start frame of the preceding one of the two object-detected sections to the end frame of the following one of the two object-detected sections is specified as one object-related section for the target object. When the motion blur does not satisfy the predetermined condition (S1001: NO), the processing moves onto Step S606.

The predetermined condition used as the criterion for the judgment in Step S1001 may be whether or not the motion blur of the entire frame observed in the section present between the two object-detected sections exceeds a predetermined amount.

One example of the scheme for obtaining the amount of motion blur is to calculate the optical flows representing the displacement of pixels between consecutive frames and then calculate the average of the optical flows. The average of the optical flows is regarded to represent the displacement of the entire image between the consecutive frames and thus regarded as the amount of motion blur.

Note that the optical flow of each pixel between the consecutive frames is represented as the displacement of the pixel on the image plane. This is because the rotation amount between the consecutive frames can be regarded approximately 0. That is, the optical flow of each pixel between the consecutive frames is represented by a vector (ui, vi), where the vector component ui represents the displacement in the X-axis direction, and the vector component vi represents the displacement in the Y-axis direction.

FIG. 12 shows an example of information about the motion blur calculated in the respective frames. The items of information shown in FIG. 12 include a frame ID and an image displacement of each frame. In FIG. 12, the image displacement in each frame represents the displacement of the entire image between that frame and the immediately preceding frame. In particular, the image displacement is represented by a vector (ui, vi). For example, the image displacement for frame 55 is the image-to-image displacement between frame 55 and frame 54, which is the frame immediately preceding frame 55. The image displacement for frame 55 is represented by vector 55.

Figure 13:
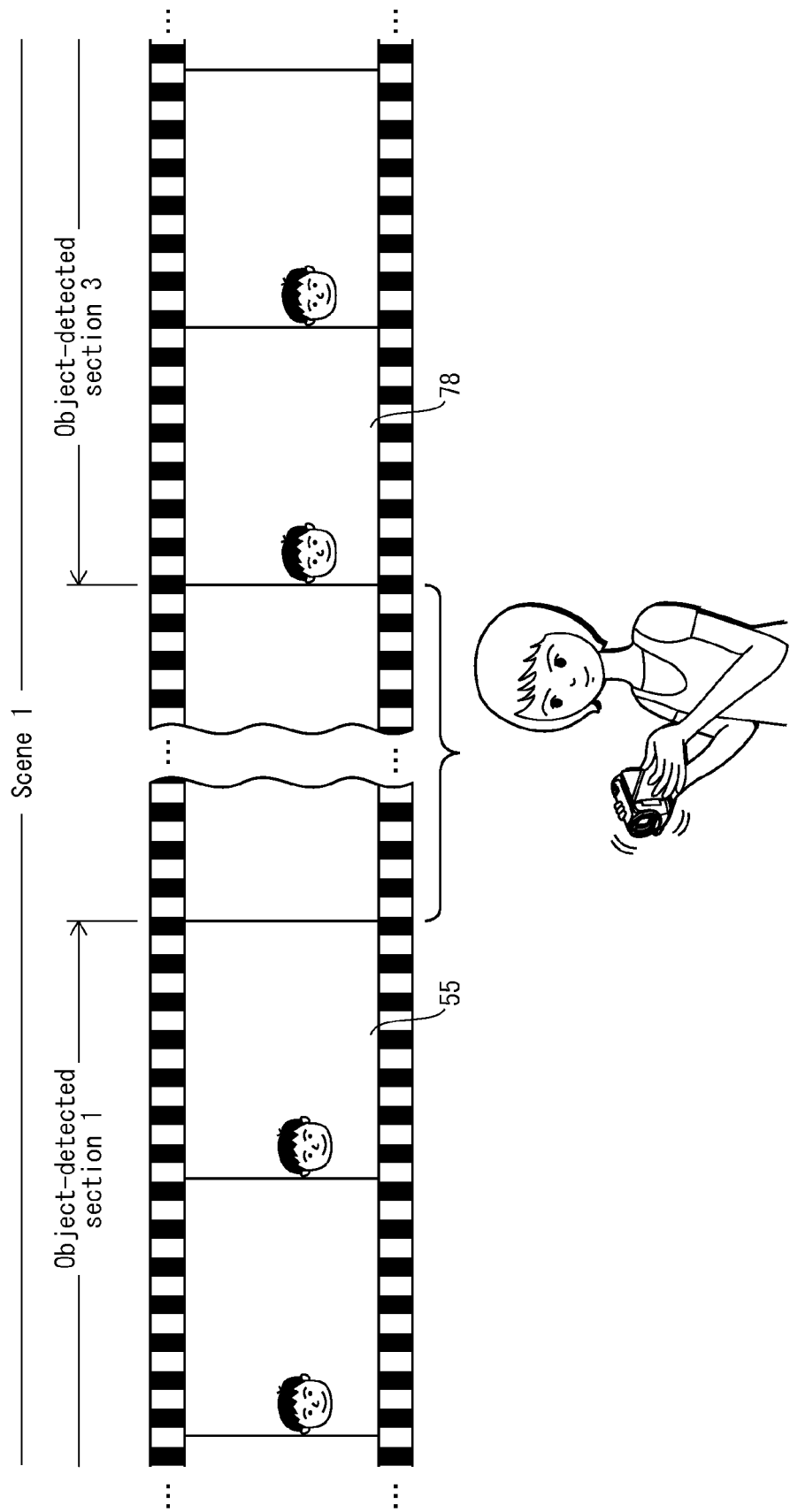
FIG. 13 illustrates a process of specifying an object-related section according to Embodiment 2.

Now, the processing performed in Step S1001 is concretely described with reference to FIGS. 4, 12, and 13.

In this specific example, the predetermined condition used as the criterion for the judgment by the object-related section specifier 106 in Step S1001 is whether or not the amount of motion blur calculated for a non-detected section present between the two object-detected sections is larger than a predetermined amount. Suppose, in addition, that object-detected sections 1 and 3 are selected as the two object-detected sections in Step S602. The section present between object-detected sections 1 and 3 is composed of a sequence of frames 56-77.

In Step S1001, for each of frames 56-77 of the section present between object-detected sections 1 and 3, the object-related section specifier 106 judges whether or not the motion blur is larger than the predetermined amount. In FIG. 11, the motion blurs calculated for frames 56-77 are represented by vectors 56-77, respectively. Thus, when vectors 56-77 all exceed the predetermined amount (S1001: YES), the section from the start frame of object-detected section 1 (i.e., from frame 4) to the end frame of object-detected section 3 (i.e., to frame 98) is specified as one object-related section for object 1 (S605).

Note that the predetermined condition used as the judgment criterion in Step S1001 is not limited to the specific example described above, and any of the following conditions may be applicable, for example.

Predetermined Condition 1: The maximum value of motion blur calculated for the non-detected section present between two object-detected sections exceeds a predetermined threshold.

Predetermined Condition 2: The average value of motion blurs calculated for the non-detected section present between two object-detected sections exceeds a predetermined threshold.

Predetermined Condition 3: A predetermined number or more frames in a non-detected section present between two object-detected sections involve the motion blur larger than a predetermined threshold.

Predetermined condition 4: The change in the motion blur among the frames of non-detected section present between two object-detected sections is larger than a predetermined amount.

In the above description of Step S1001, the object-related section specifier 106 specifies an object-related section by judging whether or not the predetermined condition is satisfied with respect to the motion blur in the non-detected section present between the two object-detected sections selected in Step S602. However, the process for specifying object-related sections is not limited to Step S1001.

For example, in the case where the video shooting device has a camera shake sensor, such as a gyro sensor, the object-related section specifier 106 can specify object-related sections by using acceleration information measured by the camera shake sensor. In particular, after Step S602, the following step may be performed alternatively to Step S1001. In the alternative step (S1001A), the object-related section specifier 106 checks whether or not a predetermined condition is satisfied by the acceleration of the video shooting device measured while the video shooting device was recording the non-detected section present between the two object-detected sections selected in Step S602. When the acceleration satisfies the predetermined condition (S1001A: YES), each of the two object-detected sections as well as the non-detected section present between the two object-detected sections is specified as an object-related section for the target object (S605). On the other hand, when the acceleration does not satisfy the predetermined condition (S1001A: NO), the processing moves onto Step S606.

The predetermined condition used as the criterion for the judgment in Step S1001A may be that the maximum value of the acceleration of the video shooting device measured while the non-detected section present between the two object-detected sections was recorded exceeds a predetermined value.

As described above, the predetermined condition is met when the motion blur of the non-detected section present between the two selected object-detected sections exceeds the predetermined amount or when the acceleration of the image shooting device measured during the time the non-detected section was recorded exceeds the predetermined level. It is then assumed that the target object is not detected in the non-detected section due to the motion blur or the shake of the image shooting device.

The processing in the subsequent Steps S606 and S607 is the same as that described in Embodiment 1 and thus no description is repeated here.

<Conclusion>

In the video analyzing device according to Embodiment 2, the object-related section specifier 106 specifies that a non-detected section, which is a video section in which a target object is not detected, is an object-related section for the target object, provided that the conditions (1A) and (2A) below are both satisfied.

(1A) The non-detected section and the object-detected sections, one immediately preceding and the other immediately following the non-detected section in time sequence, are all included in the same scene.

(2A) The motion blur (or the change in acceleration of the image shooting device) observed in the non-detected section is greater than a predetermined level.

When the conditions (1A) and (2A) are both satisfied, the non-detected section is assumed, for example, to be (iii) a section in which the target object actually appears but is not detected due to the motion blur or (iv) a section in which the target object does not appear because the target object was out of the camera frame at the time of the video shooting as a result of a large motion of the photographer. With the video analyzing device according to Embodiment 2, each section in which a target object is detected is managed as an object-related section for the target object. In addition, each section assumed to relate to the target object, as in the case of the sections (iii) and (iv) above, is also managed as the object-related section for the target object. Therefore, it is ensured that the user can easily extract sections related to a specific object from video and that a video composed of the extracted sections is a desirable one for the user to watch.

Embodiment 3-1

A video analyzing device according to Embodiment 3-1 determines whether a non-detected section, which is a video section in which a target object is not detected, is an object-related section for the target object by making a judgment on another object (i.e., object different from the target object) also detected in the non-detected section.

The following describes the video analyzing device according to Embodiment 3-1. The components and steps overlapping with those described in the embodiments described above are denoted by the same reference signs and relevant description is omitted.

Similarly to the video analyzing device 100 according to Embodiment 1, the video analyzing device according to Embodiment 3-1 is connected to a video shooting device and a display device (FIG. 1). The functionality and so on of the video shooting device 120 and the display device 130 are similar to those described in Embodiment 1. Therefore, the description thereof is omitted.

The internal structure of the video analyzing device of Embodiment 3-1 is similar to that of the video analyzing device 100 (FIG. 1) described in Embodiment 1. Therefore, the description thereof is omitted. Yet, the specific processing performed by the object-related section specifier 106 of the video analyzing device according to Embodiment 3-1 differs from that described in relation to the video analyzing device 100 according to Embodiment 1. The detailed description is given later.

Next, the operation of the video analyzing device according to Embodiment 3-1 is described.

The video analyzing device according to Embodiment 3-1 first acquires a video (FIG. 2: S201), then detects, tracks, and identifies objects (S202-S204), and finally detects scene boundaries in the video (S205) in a manner similar to the video analyzing device 100 according to Embodiment 1. These steps are similar to those described in Embodiment 1 and therefore the description thereof is omitted.

Next, the object-related section specifier 106 of the video analyzing device according to Embodiment 3-1 specifies object-related sections based on the scene boundary information, in addition to the information about object detection, tracking, and identification (S206B). The specific processing performed in Step S206B differs from that performed in Step S206 of the Embodiment 1 described above.

Figure 14:
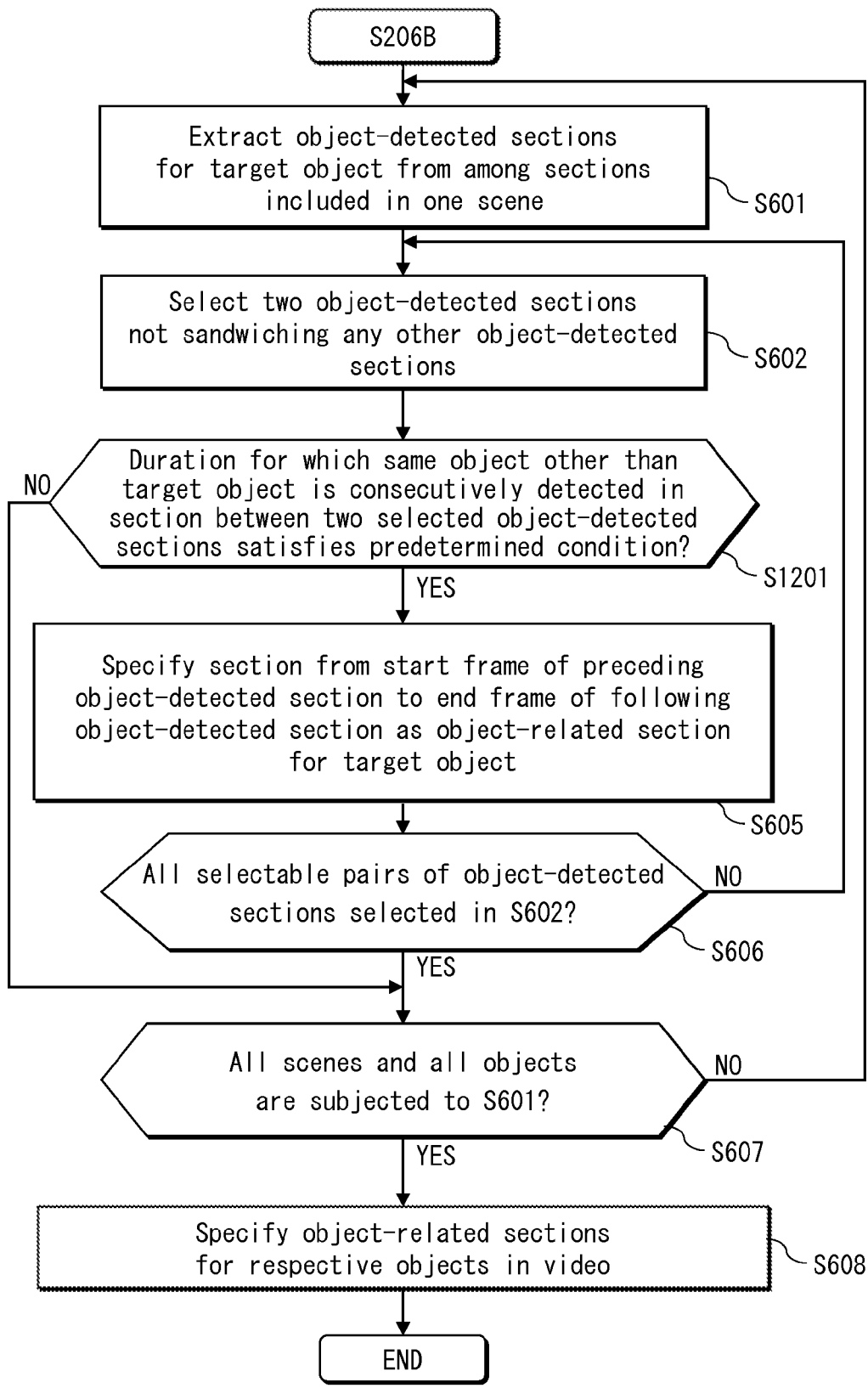
FIG. 14 is a flowchart of a process of specifying object-related sections according to Embodiment 3-1.

With reference to the flowchart in FIG. 14, Step S206B is described.

The processing performed in Steps S601 and S602 is the same as that described in Embodiment 1.

In Step S601, the object-related section specifier 106 extracts object-detected sections which are included in the same scene and in which objects identified as the same object by the object identifier 104 are detected.

Next, in Step S602, the object-related section specifier 106 selects two of the object-detected sections extracted in Step S601 in a manner that any other object-detected section extracted in Step S601 is not placed between the two selected object-detected sections.

Next, with respect to an object different from the target object and detected in the non-detected section present between the two object-detected sections selected in Step S602, the object-related section specifier 106 judges whether or not the duration in which the different object is detected satisfies a predetermined condition (S1201). When the duration in which the different object is detected satisfies the predetermined condition (S1201: YES), the object-related section specifier 106 specifies each of the two object-detected sections as well as the non-detected section present between the two object-detected sections is an object-related section that is related to the target object (S605). In other words, in Step S605, the section from the start frame of the preceding one of the two object-detected sections to the end frame of the following one of the two object-detected sections is specified as one object-related section for the target object (S605). On the other hand, when the duration in which the other object is detected does not satisfy the predetermined condition (S1201: NO), the processing moves onto Step S605.

The predetermined condition used as the criterion for the judgment in Step S1201 may be that the duration in which the other object is detected exceeds a predetermined length.

The predetermined length of duration may be set to be sufficiently shorter than the section from the start frame of the preceding one of the two object-detected sections selected in Step S602 to the end frame of the following object-detected section but corresponds to a certain percentage of the entire duration of the section present between the two object-detected sections.

The processing in the subsequent Steps S606 through S608 is the same as that described in Embodiment 1 and thus no description is repeated here.

Now, the processing performed in Step S1201 is concretely described with reference to FIGS. 4 and 15.

In the specific example given here, the predetermined condition used as the criterion for the judgment in Step S1201 is that the duration in which the other object is detected in the non-detected section corresponds to 50% or more of the duration of the entire non-detected section. Suppose, in addition, that object-detected sections 1 and 3 are selected as the two object-detected sections in Step S602. The non-detected section present between object-detected sections 1 and 3 is composed of a sequence of frames from frame 56 to frame 77, which amounts to 22 frames. That is, the number of frames corresponding to 50% or more of the duration of the entire non-detected section present between object-detected sections 1 and 3 is calculated to be 11 (=22×0.5) or greater. In addition, of a sequence of frames from frame 56 to frame 77, a sequence of frames from 60 to frame 74 corresponds to object-detected section 2 in which object 2 is detected. That is, object 2 is the one detected in Step S1201 as the object different from the target object. Therefore, object-detected section 2 is the duration in which object 2 is detected in the non-detected section and the number of frames constituting the object-detected section is 15.

In the situations described above, it is judged in Step S1201 that the duration in which object 2 is detected corresponds to 15 frames, which is more than 11 frames, i.e., more than 50% of the entire duration of the section present between the object-detected sections 1 and 3 (S1201: YES). Therefore, the object-related section specifier 106 specifies the section from the start frame of the preceding one of the two object-detected sections (i.e., from frame 4) to the end frame of the following object-detected section (i.e., to frame 98) as one object-related section for object 1.

As described above, the predetermined condition is met when the duration in which an object different from the target object is detected in the non-detected section present between two selected object-detected sections is longer than the predetermined length. It is then assumed that the target object is not detected in the non-detected section because the photographer turned the camera to the other object for a certain amount of time.

<Conclusion>

In the video analyzing device according to Embodiment 3-1, the object-related section specifier 106 specifies that a non-detected section, which is a video section in which a target object is not detected, is an object-related section for the target object provided that the conditions (1B) and (2B) below are both satisfied.

(1B) The non-detected section and the object-detected sections, one immediately preceding and the other immediately following the non-detected section in time sequence, are all included in the same scene.

(2B) Duration of a section in which an object different from the target object is detected in the non-detected section is longer than the predetermined length.

When the conditions (1B) and (2B) are both satisfied, the non-detected section is assumed, for example, to be (v) a section in which the target object does not appear because the photographer intentionally takes a sequence video images of an object different from the target object for a certain period of time. With the video analyzing device according to Embodiment 3, each section in which a target object is detected is managed as an object-related section for the target object. In addition, each section assumed to relate to the target object, as in the case of the section (v) above, is also managed as the object-related section for the target object. Therefore, it is ensured that the user can easily extract sections related to a specific object from video and that a video composed of the extracted sections is a desirable one for the user to watch.

Embodiment 3-2

A video analyzing device according to Embodiment 3-2 specifies that a non-detected section, which is a video section in which a target object is not detected, is an object-related section for the target object when an object different from the target object is detected in the non-detected section and the location of the different object overlaps at least partially with the frame region in which the target object is estimated to appear.

The following describes the video analyzing device according to Embodiment 3-2. The components and steps overlapping with those described in the embodiments described above are denoted by the same reference signs and relevant description is omitted.

Similarly to the video analyzing device 100 according to Embodiment 1, the video analyzing device according to Embodiment 3-2 is connected to a video shooting device and a display device (FIG. 1). The functionality and so on of the video shooting device 120 and the display device 130 are similar to those described in Embodiment 1. Therefore, the description thereof is omitted.

The internal structure of the video analyzing device of Embodiment 3-2 is similar to that of the video analyzing device 100 (FIG. 1) described in Embodiment 1. Therefore, the description thereof is omitted. Yet, the specific processing performed by the object-related section specifier 106 of the video analyzing device according to Embodiment 3-2 differs from that described in relation to the video analyzing device 100 according to Embodiment 1. The detailed description is given later.

Next, the operation of the video analyzing device according to Embodiment 3-2 is described.

The video analyzing device according to Embodiment 3-2 first acquires a video (FIG. 2: S201), then detects, tracks, and identifies objects (S202-S204), and finally detects scene boundaries in the video (S205) in a manner similar to the video analyzing device 100 according to Embodiment 1. These steps are similar to those described in Embodiment 1 and therefore the description thereof is omitted.

Next, the object-related section specifier 106 of the video analyzing device according to Embodiment 3-2 specifies object-related sections based on the scene boundary information, in addition to the information about object detection, tracking, and identification (S206C). The specific processing performed in Step S206C differs from that performed in Step S206 of the Embodiment 1 described above.

Figure 16:
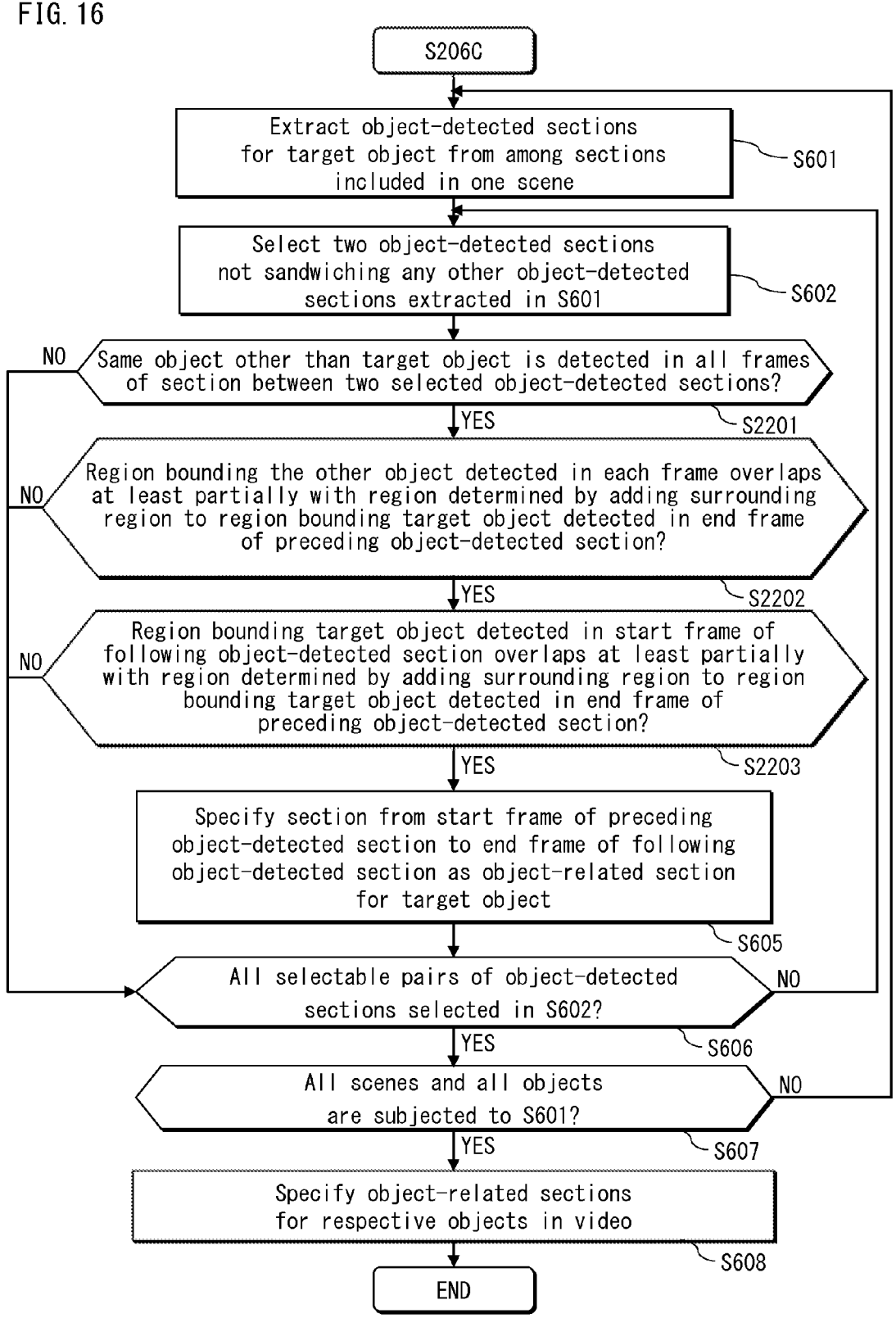
FIG. 16 is a flowchart of a process of specifying object-related sections according to Embodiment 3-2.

With reference to the flowchart in FIG. 16, Step S206C is described.

The processing performed in Steps S601 and S602 is the same as that described in Embodiment 1.

In Step S601, the object-related section specifier 106 extracts object-detected sections which are included in the same scene and in which objects identified as the same object by the object identifier 104 are detected.

Next, in Step S602, the object-related section specifier 106 selects two of the object-detected sections extracted in Step S601 in a manner that any other object-detected section extracted in Step S601 is not placed between the two selected object-detected sections.

Next, the object-related section specifier 106 determines whether or not an object different from the target object is detected in all the frames of the non-detected section present between the two object-detected sections (S2201). If the determination results in the affirmative (S2201: YES), the object-related section specifier 106 moves onto Step S2202. On the other hand, if the determination results in the negative (S2201: NO), the object-related section specifier 106 moves onto Step S606.

In Step S2202, the object-related section specifier 106 judges whether or not the detection region of the different object (i.e., the region bounding the different object) in each frame of the non-detected section overlaps at least partially with a target region that is determined by adding a predetermined surrounding region to the detection region of the target object (i.e., to the region bounding the target object) detected in the end frame of the prior one of the two object-detected sections. When there is an overlap at least partially (S2202: YES), the processing moves onto Step S2203. When there is no overlap (S:2202: NO), the processing moves onto Step S606.

In Step S2203, the object-related section specifier 106 judges whether or not the detection region of the target object in the start frame of the following one of the two object-detected sections overlaps at least partially with the target region. As described above, the target region is determined by adding the predetermined surrounding region to the detection region of the target object detected in the end frame of the preceding one of the two object-detected sections. When there is an overlap at least partially (S2203: YES), the object-related section specifier 106 specifies that each of the two object-detected sections as well as the non-detected section present between the two object-detected sections is an object-related section for the target object (S605). In other words, in Step S605, the section from the start frame of the preceding one of the two object-detected sections to the end frame of the following one of the two object-detected sections is specified as one object-related section for the target object. When there is no overlap (S2203: NO), the processing moves onto Step S606.

The processing in the subsequent Steps S606 through S608 is the same as that described in Embodiment 1 and thus no description is repeated here.

Now, the processing performed in Steps S2201-S2203 is concretely described with reference to FIGS. 4 and 17.

In the specific example given here, it is supposed that object-detected sections 3 and 5 are selected in Step S602. In addition, the target object detected in both object-detected sections 3 and 5 is object 1 which corresponds to person A in the example shown in FIG. 17.

The section present between object-detected sections 3 and 5 is composed of a sequence of frames from 99 to 112, which is part of object-detected section 4 (composed of a sequence of frames from 92 to 133). Note that object-detected section 4 is a section in which object 3 is detected. Object 3 is the object different from the target object and detected in all frames of the non-detected section present between object-detected sections 3 and 5. In the example shown in FIG. 17, object 3 corresponds to person B.

In this example, object 3 (person B) which is different from object 1 (person A) is detected in all frames of the non-detected section present between object-detected sections 3 and 5, namely from frames 99-112 (S2201: YES). Therefore, the object-related section specifier 106 moves onto Step S2202.

Figure 17:
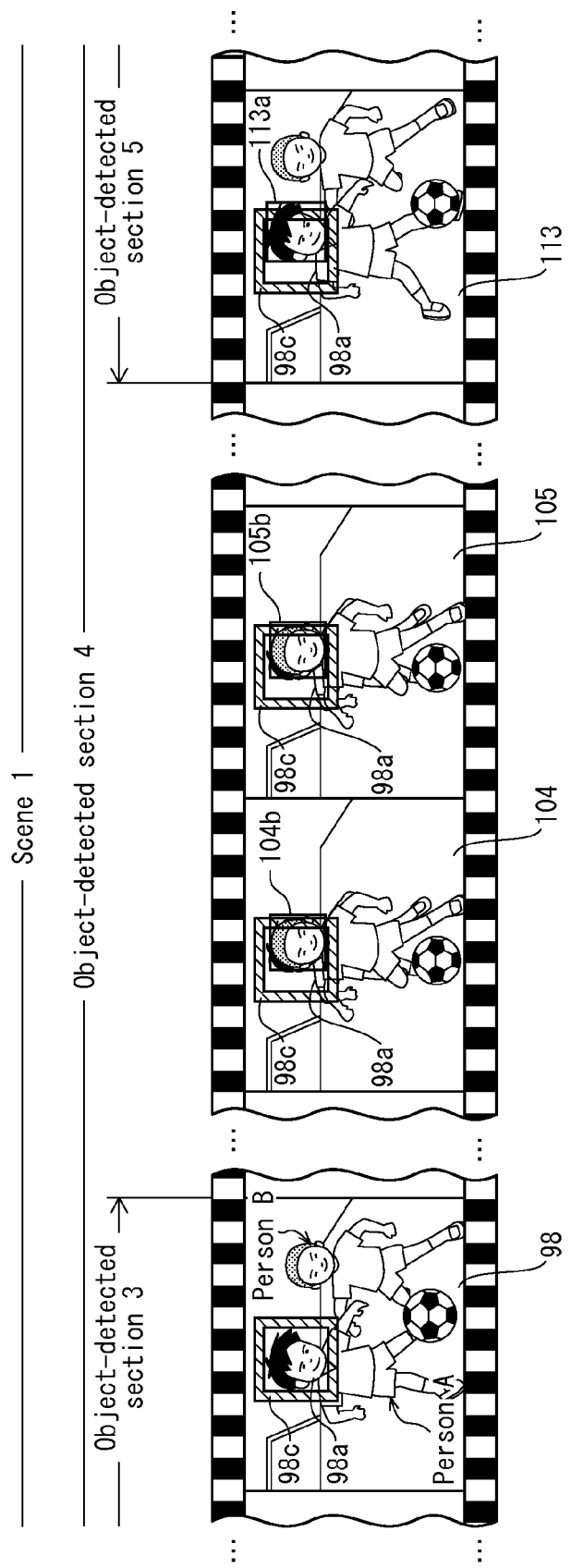
FIG. 17 illustrates a process of specifying object-related sections according to Embodiment 3-2.

In FIG. 17, each of regions 104b and 105b in frames 104 and 105, respectively, is an example of a detection region bounding person B (i.e., the different object) detected in each of frames 99-112 constituting the non-detected section present between object-detected sections 3 and 5. Of object-detected sections 3 and 5, the one preceding the other in time sequence is object-detected section 3, and the end frame thereof is frame 98. In frame 98, a region 98a is the detection region bounding person A being the target object. In addition, a region 98c which is diagonally shaded in FIG. 17 is a predetermined surrounding region.

With reference to frame 104 shown in FIG. 17, the detection region 104b bounding person B in frame 104 partially overlaps with the target region determined by adding the predetermined surrounding region 98c to the detection region 98a bounding person A in frame 98. Similarly, with reference to frame 105, the region 105b overlaps at least partially with the target region determined by adding the regions 98a and 98c. As in the cases of frames 105 and 106, in each of frames 99-112 constituting the non-detected section present between object-detected sections 3 and 5, the detection region bounding person B overlaps at least partially with the target region determined by adding the regions 98a and 98c (S2202: YES). In this case, the object-related section specifier 106 moves onto Step S2203.

With reference back to object-detected sections 3 and 5, the one behind the other in time sequence is object-detected section 5, and the start frame thereof is frame 113. In frame 113, a region 113a is the detection region bounding person A being the target object.

With reference to frame 113 shown in FIG. 17, the detection region 113a bounding person A in frame 113 partially overlaps with the target region determined by adding the predetermined surrounding region 98c to the detection region 98a bounding person A detected in frame 98 (S2203: YES). In this case, the object-related section specifier 106 specifies the section from the start frame of object-detected section 3 (i.e., from frame 78) to the end frame of object-detected section 5 (to frame 224) as one object-related section for person A (object 1) (S605).

As described above, through Steps S2201-S2203, it is assumed that person A is not detected in the section present between the two object-detected sections because person A is occluded by person B located closer toward the photographer at the time when the section was recorded.

As described above, when an object different from the target object is detected in all frames of a non-detected section present between the two selected object-detected sections, each frame of the non-detected section as well as the start frame of the following object-detected section is compared against the end frame of the preceding object-detected section to see if the target region overlaps at least partially with the region bounding the different object detected in each frame of the non-detected section and also in the start frame of the following object-detected section. Note that the target region is determined by adding the predetermined surrounding region to the region bounding the target object detected in the end frame of the preceding object-detected section. When each comparison shows that there is an overlap at least partially with the target region, it is assumed that the target object is not detected in the non-detected section because the target object is occluded by the different object located closer toward the photographer at the time of image shooting.

In Steps S2202 and S2203, the predetermined surrounding region is added to the detection region of the target object to judge whether there is an overlap with the target object. This is to accommodate changes in a motion that the target object is expected to undergo in the non-detected section.

For example, as shown in FIG. 17, the section from the start frame of object-detected section 3 to the end frame of object-detected section 5 represents an image sequence in which person A and person B are chasing a soccer ball. That is, throughout the image sequence, person A and person B are constantly moving rather than being still. Therefore, as shown in FIG. 17, the detection region bounding person A detected in the end frame of object-detected section 3 (i.e., in frame 98) may not always coincide with the detection region bounding person A detected in the start frame of object-detected section 5 (i.e., in frame 113). The same holds for the section present between object-detected sections 3 and 5 in which person A is not detected. That is, the region in which person A is expected to be located, i.e., the region occluded behind person B as seen from the photographer, is assumed to move. In order to accommodate the displacement of the detection region of the target object, it is preferable to add a region surrounding the detection region of the target object to ensure an appropriate judgment regarding the overlapping between the target object and the different object by the object-related section specifier 106 in Steps S2202 and S2203.

Figure 18:
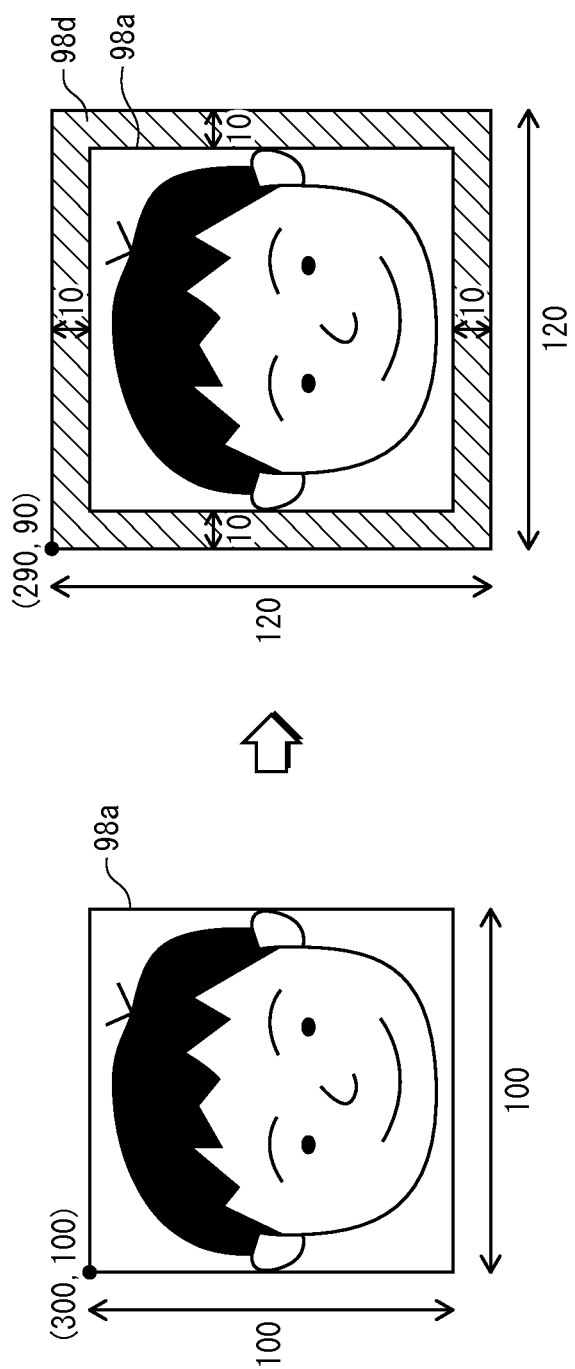
FIG. 18 shows an example of a predetermined surrounding region used in the process of specifying object-related sections according to Embodiment 3-2.
Figure 19:
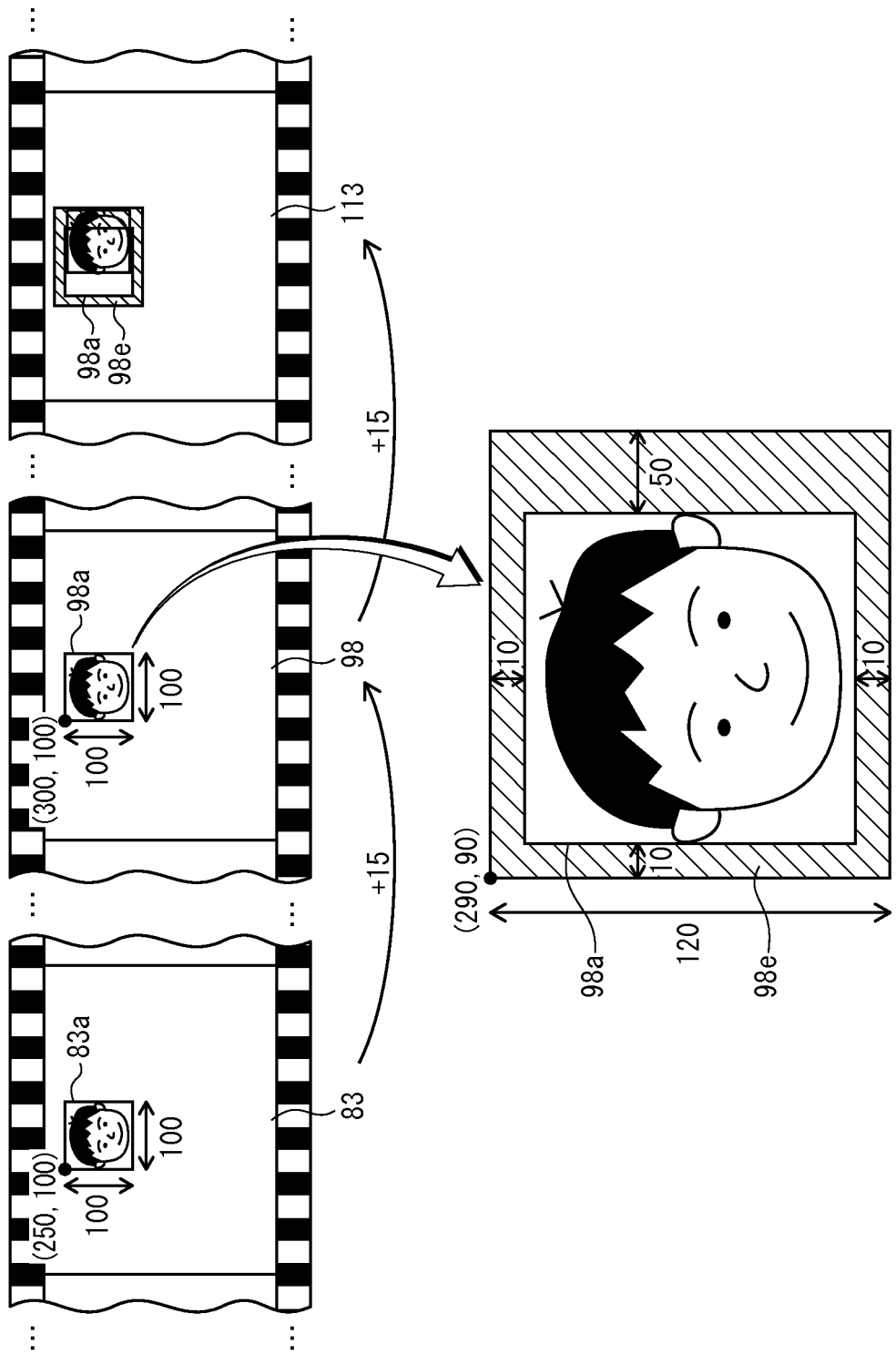
FIG. 19 is a view showing another example of the predetermined surrounding region used in the process of specifying object-related sections according to Embodiment 3-2.

With reference now to FIGS. 18 and 19, example settings of the surrounding region of the detection region bounding the target object are described.

FIG. 18 illustrates an example in which the region surrounding the detection region is set in view of the size of the detection region. In FIG. 18, a diagonally shaded region 98d represents the predetermined surrounding region set for the detection region 98a bounding object 1 that is detected in frame 98 of object-detected section 3. The region 98d is formed of 10 pixels (=10 percent of 100 pixels, which corresponds to the width and length of the detection region 98a) located to surround the four edges of the detection region 98a. As in this example, the surrounding region may be determined to have a predetermined number of pixels located to surround the four edges of the detection region, and the predetermined number of pixels in each direction corresponds to a predetermined percentage of the width and length of the detection region.

In the example shown in FIG. 18, the number of pixels surrounding each of the four edges of the detection region are uniformly 10 percent of the width and length of the detection region. Alternatively, however, the percentage may be made to differ between the pixels along the width direction and the pixels along the length direction. In one example, the surrounding region may have pixels corresponding to 10 percent of the length of the target region and 15 percent of the width of the target region.

FIG. 19 illustrates an example in which the surrounding region may be determined in view of the displacement of the detection region bounding the target object over a plurality of frames. In FIG. 19, in the section from frame 83 to frame 98, the detection region of the target object (object 1) moves in the X-axis direction at a constant amount corresponding to 50 pixels per frame (from 83a to 98a). In view of the movement in the section from frames 83 to 98, it is highly expected that the target object would move in the same direction and by the same amount over the section from the section frames 98 to 113. In view of the movement of the object in the section from frames 83 to 98, a diagonally shaded region 98e shown in FIG. 19 (at the bottom) may be determined as the surrounding region of the detection region 98a. As shown in the figure, the region 98e has 50 pixels along the right edge of the detection region 98a. As in this example, the region surrounding the detection region bounding the target object may be set in view of the displacement of the detection region.

In the example shown in FIG. 19, the number of frames present between the end frame of the preceding one of the two object-detected sections and the start frame of the following object-detected section (i.e., between frames 98 and 113) is 15. Therefore, the surrounding region is set in consideration of the displacement of the target object made over the section starting from frame 83, which is located 15 frames before frame 98 in time sequence, to frame 98. Note that the scheme for setting the predetermined surrounding region is not limited to the one described above. The predetermined surrounding region may be set in consideration of the displacement of the target object over the section starting from the frame located a predetermined number of frames before the end frame of the preceding one of the object-detected sections (i.e., from frame 98).

In addition, although the example illustrated in FIG. 19 is directed to the case where the detection region bounding the target object moves in the positive X-axis direction, the detection region bounding the target object may move in another direction. The predetermined surrounding region may be set in the displacement in whichever direction the displacement is made.

In addition, although FIG. 19 illustrates the example in which the target object moves by a constant amount per frame over the section from frames 83 to 98, the displacement of the target object is not limited to such. In view of the above, in addition to the displacement between each two consecutive frames over the section from frames 83 to 98, tracking information of the target object generated by the object tracker 103 may be considered to calculate the average of the displacements between each two consecutive frames. The predetermined surrounding region may be then set in consideration of the average displacement.

In addition, the displacement of an object is not limited to the movement of the detection region bounding the object. That is, the size of the object per se may change. In the case where the size of the detection region bounding an object changes, the predetermined surrounding region may be set in accordance with the change in size of the detection region bounding the object.

<Conclusion>

In the video analyzing device according to Embodiment 3-2, the object-related section specifier 106 specifies a non-detected section, which is a video section in which a target object is not detected, as an object-related section for the target object, provided that the conditions (1C) through (3C) below are all satisfied.

(1C) The non-detected section and the object-detected sections, one immediately preceding and the other immediately following the non-detected section in time sequence, are all included in the same scene.

(2C) An object different from the target object is detected in the non-detected region.

(3C) The target region overlaps at least partially with the detection region bounding the different object detected in each frame of the non-detected section (i.e., the sections in which the target object is not detected) and also with the detection region bounding the target object detected in the start frame of the following one of the two object-detected sections (i.e., the sections in which the target object is detected). Note that the target region is determined by adding the predetermined surrounding region to the detection region bounding the target object detected in the end frame of the preceding object-detected section.

When the conditions (1C) through (3C) mentioned above are all satisfied, it is assumed that the non-detected section is assumed to be (vi) a section in which the target object is occluded by the different object located between the target object and the photographer. With the video analyzing device according to Embodiment 3-2, each section in which the target object is detected is managed as an object-related section. In addition, each section assumed to relate to the target object, as in the case of the section (vi) above, is also managed as the object-related section. Therefore, it is ensured that the user can easily extract sections related to a specific object from video and that a video composed of the extracted sections is a desirable one for the user to watch.

Embodiment 4

In Embodiment 4, a video analyzing device determines whether or not a non-detected section, which is a video section in which a specific object is not detected, is an object-related section by making a judgment regarding the duration of the non-detected section.

The following describes the video analyzing device according to Embodiment 4. The components and steps overlapping with those described in the embodiments described above are denoted by the same reference signs and relevant description is omitted.

Similarly to the video analyzing device 100 according to Embodiment 1, the video analyzing device according to Embodiment 4 is connected to a video shooting device and a display device (FIG. 1). The functionality and so on of the video shooting device 120 and the display device 130 are similar to those described in Embodiment 1. Therefore, the description thereof is omitted.

The internal structure of the video analyzing device of Embodiment 4 is similar to that of the video analyzing device 100 (FIG. 1) described in Embodiment 1. Therefore, the description thereof is omitted. Yet, the specific processing performed by the object-related section specifier 106 of the video analyzing device according to Embodiment 4 differs from that described in relation to the video analyzing device 100 according to Embodiment 1. The detailed description is given later.

Next, the operation of the video analyzing device according to Embodiment 4 is described.

The video analyzing device according to Embodiment 4 first acquires a video (FIG. 2: S201), then detects, tracks, and identifies objects (S202-S204), and finally detects scene boundaries in the video (S205) in a manner similar to the video analyzing device 100 according to Embodiment 1. These steps are similar to those described in Embodiment 1 and therefore the description thereof is omitted.

Next, the object-related section specifier 106 of the video analyzing device according to Embodiment 4 specifies object-related sections based on the scene boundary information, in addition to the information about object detection, tracking, and identification (S206D). The specific processing performed in Step S206D differs from that performed in Step S206 of the Embodiment 1 described above.

Figure 20:
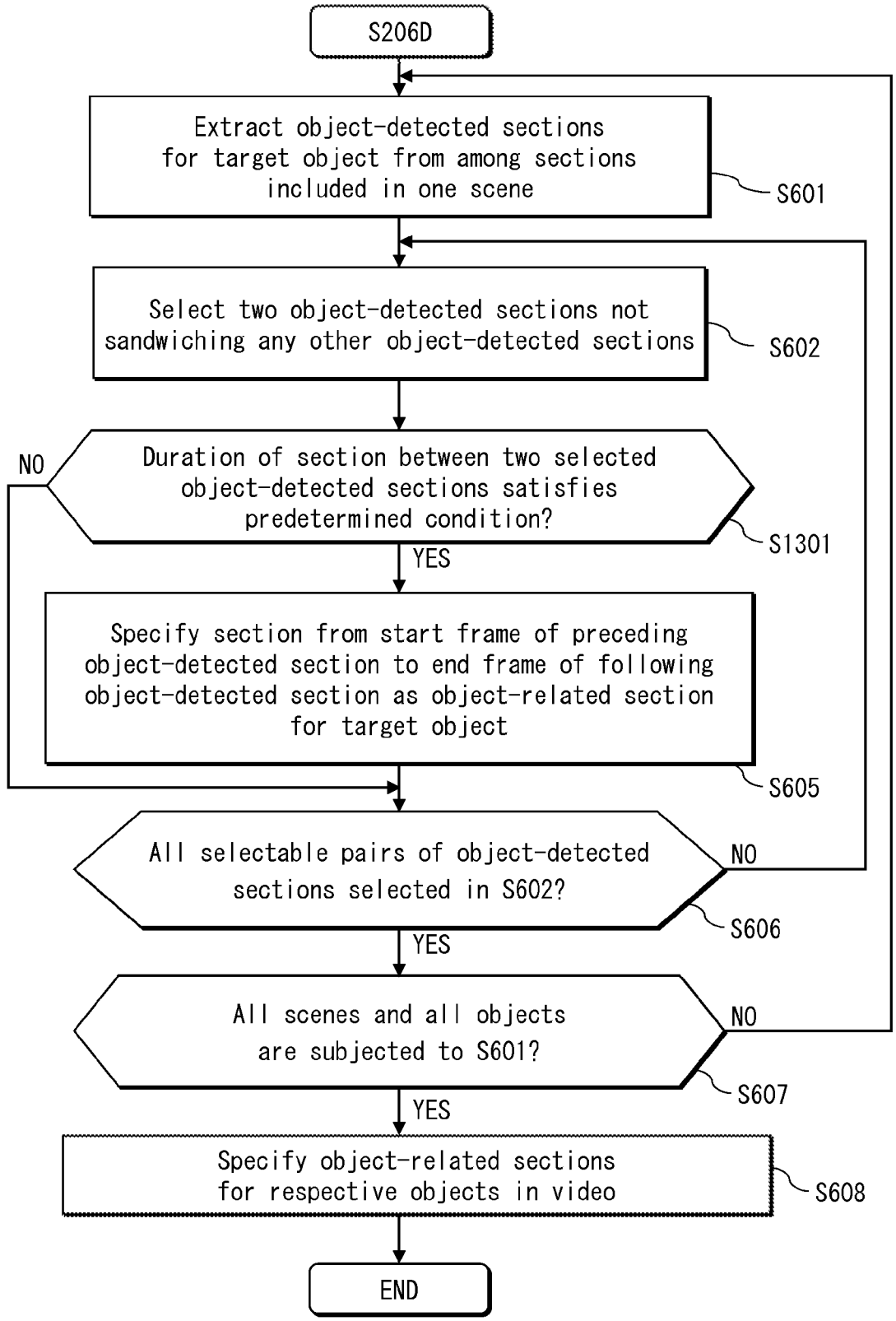
FIG. 20 is a flowchart of a process of specifying object-related sections according to Embodiment 4.

With reference to the flowchart in FIG. 20, Step S206D is described.

The processing performed in Steps S601 and S602 is the same as that described in Embodiment 1.

In Step S601, the object-related section specifier 106 extracts object-detected sections which are included in the same scene and in which objects identified as the same object by the object identifier are detected.

Next, in Step S602, the object-related section specifier 106 selects two of the object-detected sections extracted in Step S601 in a manner that any other object-detected section extracted in Step S601 is not placed between the two selected object-detected sections.

Next, the object-related section specifier 106 judges whether or not the duration of the non-detected section present between the two object-detected sections selected in Step S602 satisfies a predetermined condition (S1301). When the duration of the non-detected section satisfies the predetermined condition (S1301: YES), the object-related section specifier 106 specifies that each of the two object-detected sections as well as the non-detected section present between the two object-detected sections is an object-related section for the target object (S605). In other words, in Step S605, the section from the start frame of the preceding one of the two object-detected sections to the end frame of the following one of the two object-detected sections is specified as one object related section related to the target object. On the other hand, when the duration of the non-detected section does not satisfy the predetermined condition (S1301: NO), the processing moves onto Step S606.

The predetermined condition used as the criterion for the judgment in Step S1301 may be that the duration of the non-detected section is shorter than a predetermined length. Alternatively, the predetermined condition may be that the duration of the non-detected section is sufficiently shorter than the duration of the section from the start frame of the preceding one of the two object-detected sections to the end frame of the following object-detected section.

Figure 21:
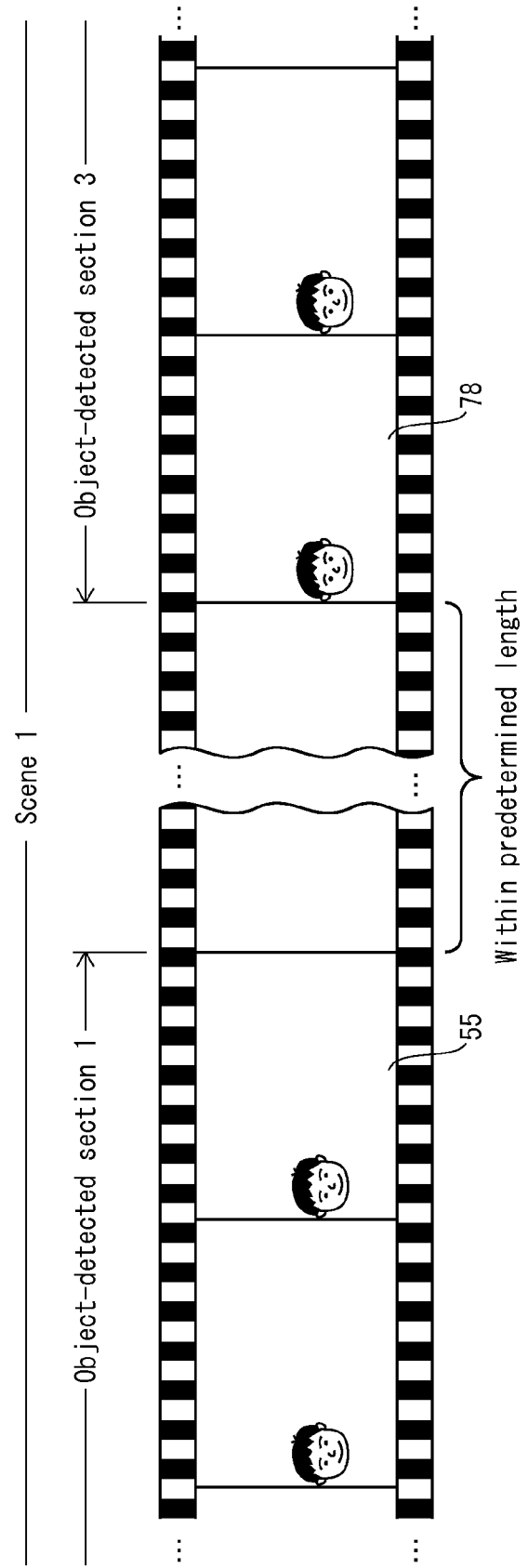
FIG. 21 illustrates a process of specifying object-related sections according to Embodiment 4.

Now, the processing performed in Step S1301 is concretely described with reference to FIGS. 4 and 21.

In the specific example given here, the predetermined condition used as the criterion for the judgment in Step S1301 is that the duration of the non-detected section corresponds to 30% or less of the duration of the section from the start frame of the preceding one of the two object-detected sections to the end frame of the following object-detected section. In addition, it is supposed that object-detected sections 1 and 3 are selected as the two object-detected sections in Step S602. Therefore, the section from the start frame of object-detected section 1 to the end frame of object-detected section 3 is a sequence of frames 4-98, which amounts to 95 frames. That is, 30 percent or less of 95 frames corresponds to 28 frames or less. In addition, the non-detected section present between object-detected sections 1 and 3 is a sequence of frames 56-77, which amounts to 22 frames.

In Step S1301, the duration of the non-detected section present between object-detected sections 1 and 3 corresponds to 22 frames, which is not more than 28 frames corresponding to 30 percent of the duration of the section from the start frame of object-detected section 1 to the end frame of object-detected section 3 (S1301: YES). Therefore, the object-related section specifier 106 specifies that the section from the start frame of the preceding one of the two object-detected sections (i.e., from frame 4) to the end frame of the following object-detected section (to frame 98) is one object-related section for object 1.

As described above, provided that the condition that the duration of the non-detected section present between the two selected object-detected sections is within the predetermined length, it is assumed that the target object is not detected in the object-detected section because the photographer did not take the images of the target object for a certain period of time.

The processing performed in Steps S606 and S607 is the same as that described in Embodiment 1.

<Conclusion>

In the video analyzing device according to Embodiment 4, the object-related section specifier 106 specifies a non-detected section, which is a video section in which a target object is not detected, as an object-related section for the target object, provided that the conditions (1D) and (2D) below are both satisfied.

(1D) The non-detected section and the object-detected sections, one immediately preceding and the other immediately following the non-detected section in time sequence, are all included in the same scene.

(2D) The duration of the non-detected section is within the predetermined length.

When that the conditions (1D) and (2D) are both satisfied, the non-detected section is assumed, for example, to be (vii) a section during which the photographer did not take the images of the target object for a certain period of time for some reason or (viii) a section that is negligible even if it is managed as the object-related section because the duration of the section is sufficiently shorter relatively to the duration of the entire object-detected section. With the video analyzing device according to Embodiment 4, each section in which a target object is detected is managed as an object-related section for the target object. In addition, each section assumed to relate to the target object, as in the case of the sections, as in the case of the sections (vii) and (viii) above, is also managed as the object-related section for the target object. Therefore, it is ensured that the user can easily extract sections related to a specific object from video and that a video composed of the extracted sections is a desirable one for the user to watch.

Embodiment 5

Similarly to the video analyzing device according to each of Embodiments 1-4, a video analyzing device according to Embodiment 5 specifies a section in which a target object is detected as an object-related section and also specifies whether or not a section in which the target object is not detected is an object-related section for the target object.

In Embodiment 5, a particular attention is paid to a highlight section showing an exciting part in a video.

As an example of a highlight section, a goal scene in a soccer match is mentioned. Suppose, for example, that a video includes a sequence of images showing in order a child being a target object kicking a ball, the ball hitting the goal net, the audience giving cheers, and the child being delighted with the goal. When a digest of the video is made according to conventional technologies, sections in which the child is not detected (such as a sequence of images showing the ball hitting the goal net or the audience giving cheers) cannot be extracted and included in the digest. Consequently, the resulting digest of video would be fragmentary and thus not a desirable one for the user to watch. From the user's standpoint, it is desirable to browse not only the sections in which the child appears but also a highlight section collectively as one section related to the child.

Note that the target object may be detected from all, some, or none of the frames constituting a highlight section extracted from a video.

In view of the above, the video analyzing device according to Embodiment 5 specifies an object-related section for one object appearing in a video.

Figure 22:
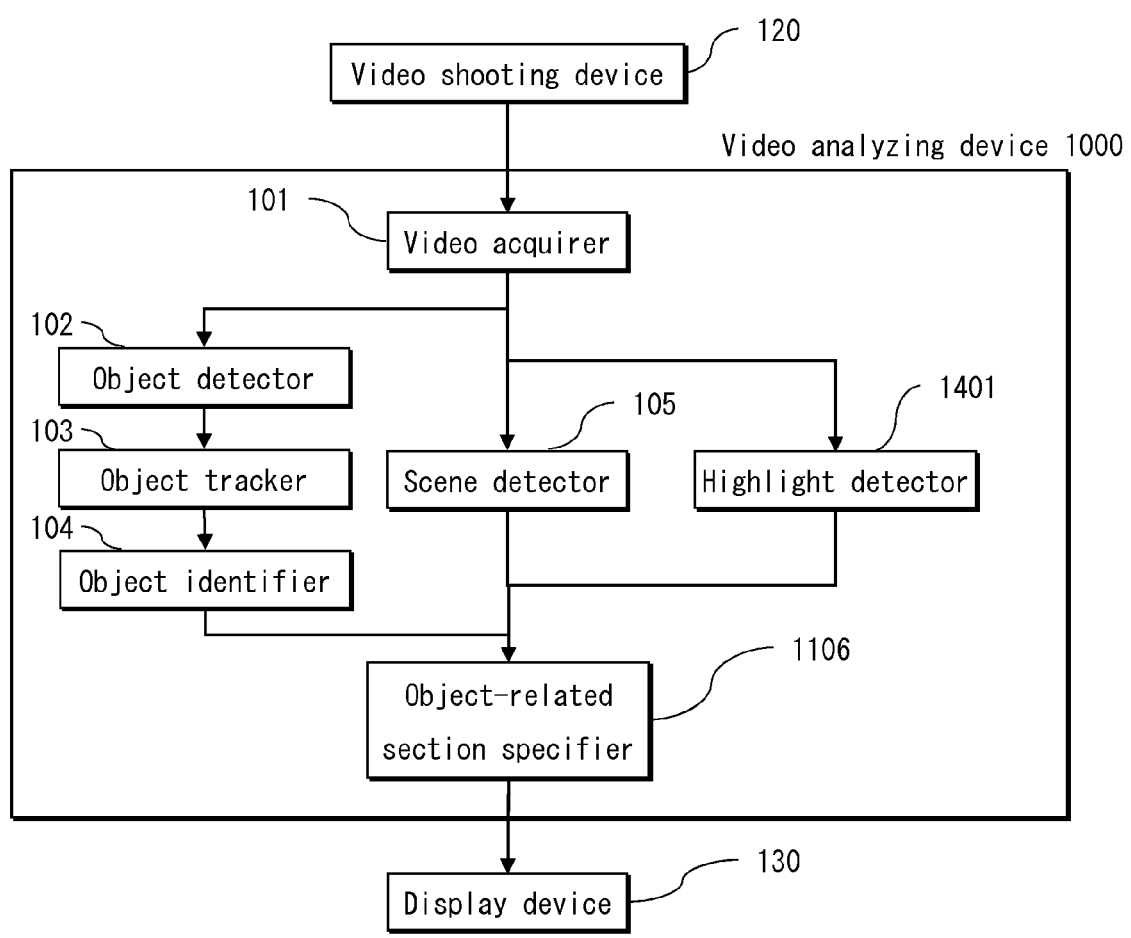
FIG. 22 is a functional block diagram of a video analyzing device 1000 according to Embodiment 5.
Figure 23:
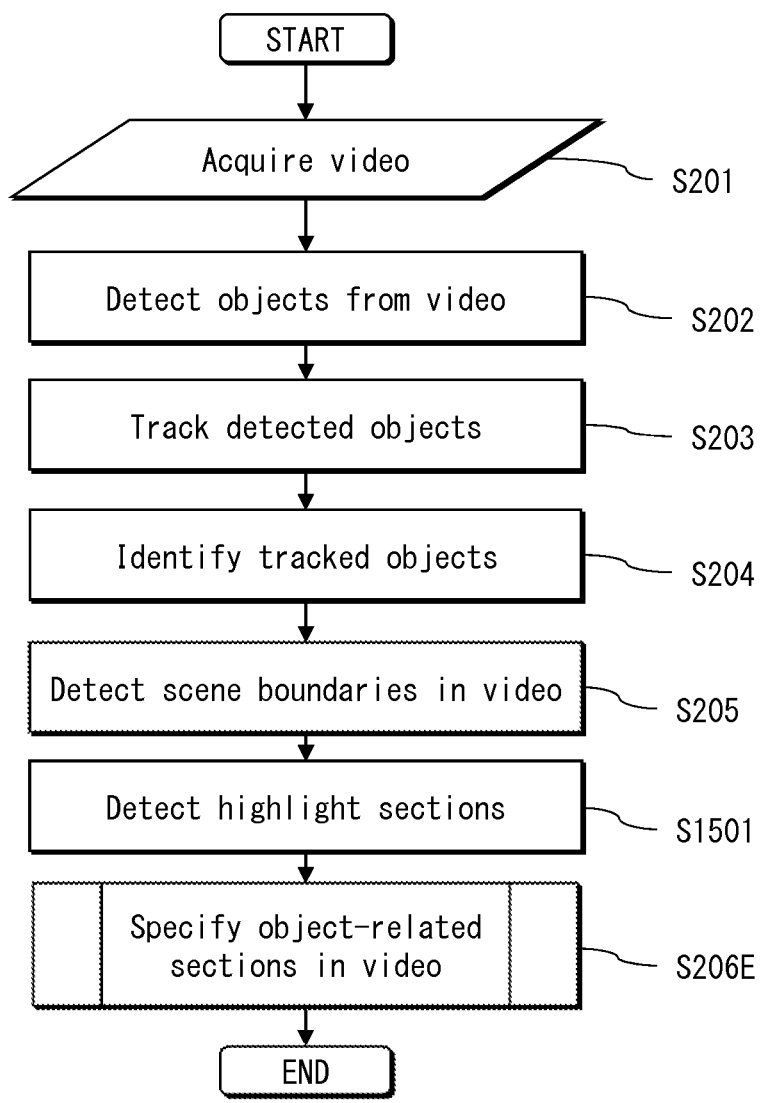
FIG. 23 is a flowchart of the overall operation of the video analyzing device 1000 according to Embodiment 5.

FIG. 22 is a functional block diagram of a video analyzing device 1000 according to Embodiment 5.

Similarly to the video analyzing device 100 according to Embodiment 1 (FIG. 1), the video analyzing device 1000 is connected to a video shooting device 120 and a display device 130. The functionality of the video shooting device 120 and the display device 130 are similar to those described in Embodiment 1. Therefore, the description thereof is omitted.

Next, the internal configuration of the video analyzing device 1000 is described.

In addition to the components of the video analyzing device 100 according to Embodiment 1 (FIG. 1), the video analyzing device 1000 includes a highlight detector 1401. In addition, instead of the object-related section specifier 106 that is included in the video analyzing device 100, the video analyzing device 1000 includes an object-related section specifier 1106.

The highlight detector 1401 detects highlight sections from a video acquired by the video acquirer 101. The details of the processing performed by the highlight detector 1401 will be given later.

The object-related section specifier 1106 specifies object-related sections for the respective objects appearing in the video. The details of the object-related section specifier 1106 will be given later.

Next, the internal configuration of the video analyzing device 1000 is described.

Figure 15:
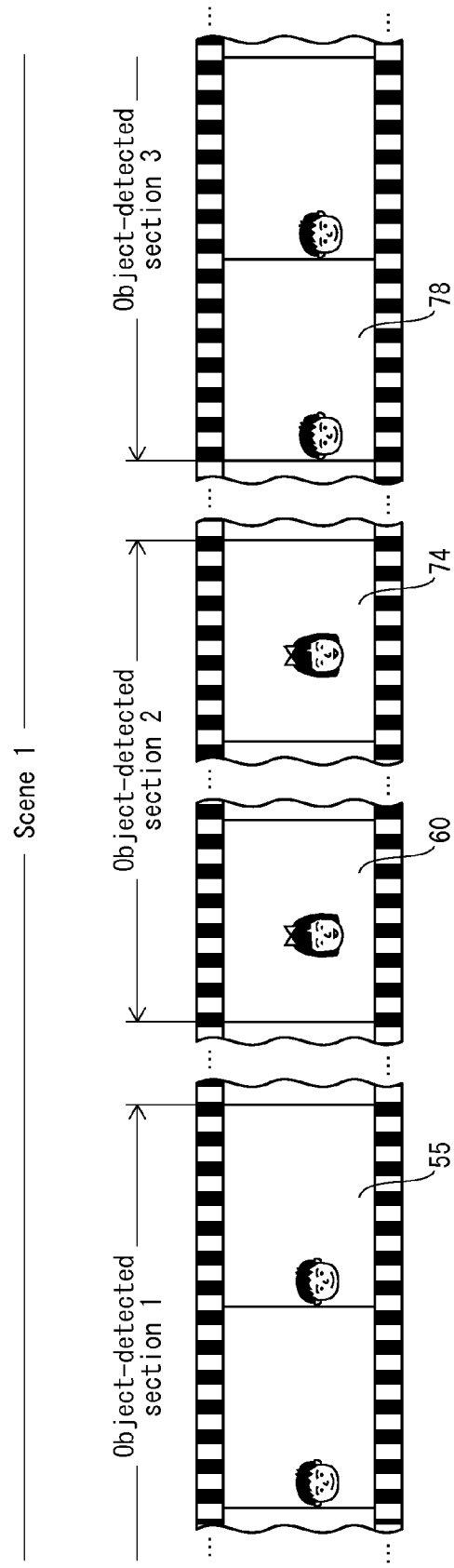
FIG. 15 illustrates a process of specifying object-related sections according to Embodiment 3-1.

FIG. 15 is a flowchart of the overall operation of the video analyzing device 1000 according to Embodiment 5.

The video analyzing device 1000 first acquires a video (FIG. 2: S201), then detects, tracks, and identifies objects (S202-S204), and finally detects scene boundaries in the video (S205) in a manner similar to the video analyzing device 100 according to Embodiment 1. These steps are similar to those described in Embodiment 1 and therefore the description thereof is omitted.

Next, the video analyzing device 1000 detects highlight sections from the video by using the highlight detector 1401 (S1501).

The term "highlight section" refers to a section corresponding to an exciting part of the video. One scheme to extract highlight sections is to extract sections in which audio power exceeds a predetermined level. With this scheme, the highlight detector 1401 can extract highlight sections based on crowd cheer or applause, for example. Examples of highlight sections to be detected include a section showing the excitement among people around the camera and a section showing a fireworks display going up into the sky at a fireworks festival. Note that the scheme of extracting highlight sections is not limited to this. For example, when the video is provided with information for identifying scenes or information related to the camera operation, such as zoom-in and -out, such information may be used for extraction of highlight sections. For example, a video section during which a zoom-in operation continued longer than a predetermined length, a sequence of frames from the start frame to the end frame of that section may be extracted as a highlight section.

Note that the highlight section information includes the IDs of the respective highlight sections in the video and the start and end frames of each highlight section. The highlight section information may be stored in a storage unit provided in the video analyzing device 1000 or in an external storage unit accessible by the video analyzing device 1000.

Next, the object-related section specifier 1106 specifies object-related sections in the video, based on: the information related to detection, tracking, and identification generated in Steps S202-S204; the scene boundary information generated in Step S205; and the highlight section information generated in Step S1501 (S206E).

Figure 24:
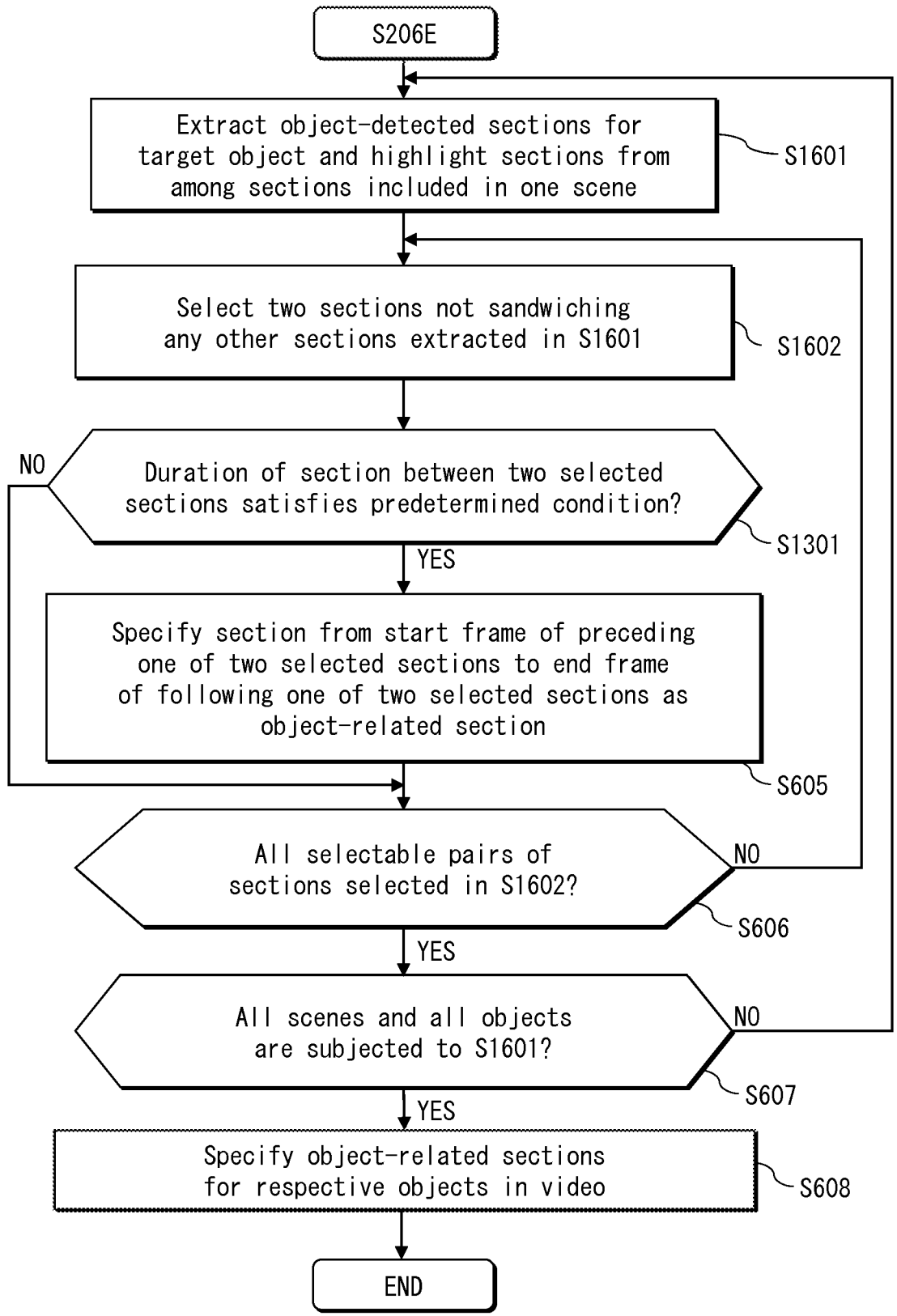
FIG. 24 is a flowchart of a process of specifying object-related sections according to Embodiment 5.

With reference to the flowchart in FIG. 24, Step S206E is described.

In Embodiment 1, the object-related section specifier 106 is described to first extract object-detected sections which are included in the same scene and in which objects identified as the same object by the object identifier 104 are detected (FIG. 6: S601).

In contrast, the object-related section specifier 1106 extracts highlight sections detected in Step S1501, in addition to object-detected sections in which objects having the same ID are detected (S1601). Note that the highlight sections and object-detected sections to be extracted in this step need to be included in the same scene.

Next, the object-related section specifier 1106 selects two sections out of the object-detected sections and highlight sections extracted in Step S1601 in a manner that any other section extracted in Step S1601 is not placed between the two selected sections (S1602).

The following specifically describes Step S1602 with reference to FIG. 4.

First, it is supposed that the sections extracted in Step S1601 are object-detected sections 1, 3, and 5 and highlight section A. It is also supposed that the start and end frames of the highlight section are frames 106 and 123, respectively.

In this case, the sections selectable in Step S1602 as a pair of sections not sandwiching any other section extracted in Step S1601 are: object-detected sections 1 and 3; object-detected section 3 and highlight section A; and highlight section A and object-detected section 5. Any other pair of sections is not selectable because one or more sections extracted in Step S1601 are located between the sections in the pair.

The processing in subsequent Steps S1301 and S605 is the same as that described in Embodiment 4. In Step S1301, the object-related section specifier 1106 judges whether or not the duration of a non-detected section present between the two sections selected in Step S1602 satisfies a predetermined condition. When the predetermined condition is met (S1301: YES), the object-related section specifier 1106 specifies the section from the start frame of the preceding one of the two sections to the end frame of the following section as one object-related section for the target object (S605).

The processing in the subsequent Steps S606 through S608 is the same as that described in Embodiment 1 and thus no description is repeated here.

Figure 25A:
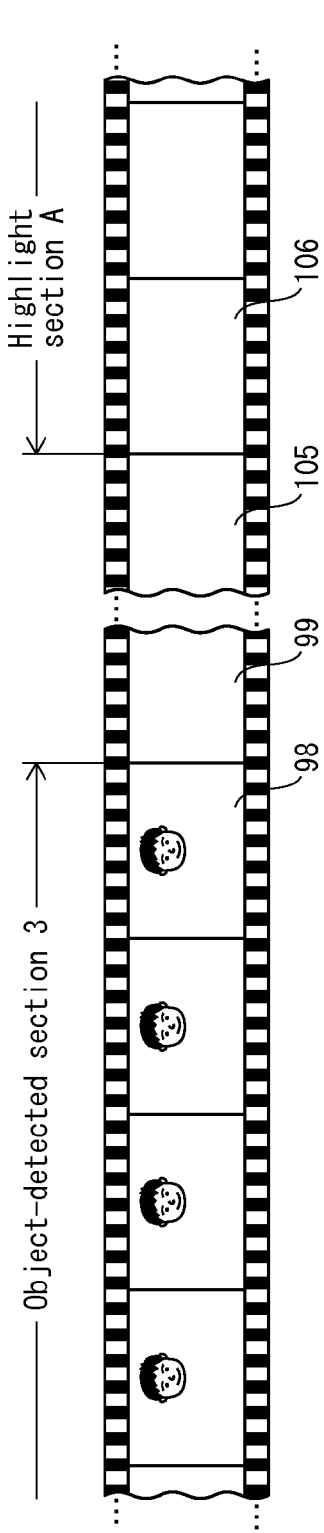
FIGS. 25A, 25B, and 25C illustrate a process of specifying object-related sections according to Embodiment 5.
Figure 25B:
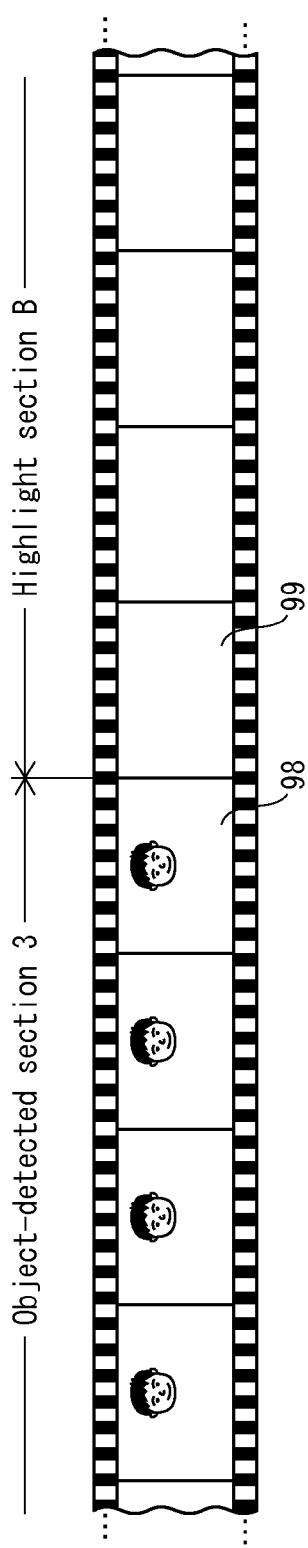
Figure 25C:
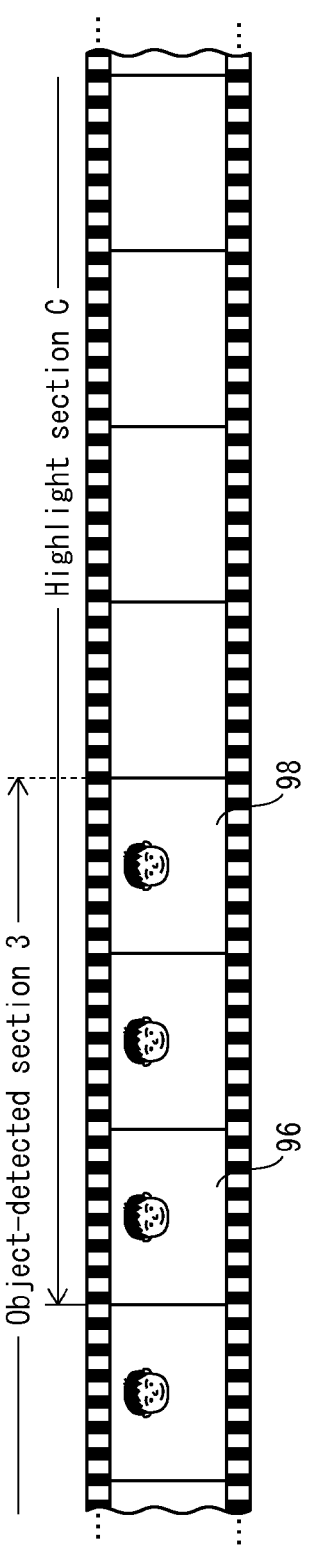

When the two sections selected in Step S1602 are one object-detected section and one highlight section, examples illustrated in FIG. 25A through 25C are assumed to be the cases. In FIGS. 25A-25C, it is supposed that the two sections selected in Step S1602 are object-detected section 3 (FIG. 4) and a corresponding one of highlight sections A through C shown in the respective figures.

In the example shown in FIG. 25A, the start and end frames of highlight section A are frames 106 and 123, respectively. Thus, the section present between object-detected section 3 and highlight section A is composed of a sequence of frames 99-105. That is, the section present between the object-detected section 3 and highlight section A is composed of six frames, which is considered to be sufficiently short. Accordingly, the section from the start frame of object-detected section 3 to the end frame of highlight section A may be specified as an object-related section for the target object.

In the example shown in FIG. 25B, the start and end frames of highlight section B are frames 99 and 123, respectively. In this example, the end frame of the object-detected section 3 and the start frame of the highlight section B are consecutive. That is, 0 frame is present between object-detected section 3 and highlight section B. Also in this case, it is applicable to specify the section from the start frame of object-detected section 3 to the end frame of highlight section B as an object-related section for the target object.

In the example shown in FIG. 25C, the start and end frames of highlight section C are frames 96 and 123, respectively. Note that object-detected section 3 partially overlaps with highlight section C. Also in this case, it is applicable to specify the section from the start frame of object-detected section 3 to the end frame of highlight section C as an object-related section for the target object.

As described above, through Step S1601, in addition to sections in which the target object is detected, a highlight section can also be specified and managed as an object-related section for the target object.

<Conclusion>

In the video analyzing device according to Embodiment 5, the object-related section specifier 1106 selects: a non-detected section, which is a video section in which the target object is not detected; an object-detected section in a consecutive relation with the non-detected section at the leading or trailing edge of the non-detected section; and another object-detected section in a consecutive relation with the non-detected section at the other edge or a highlight section in a consecutive or overlapping relation with the non-detected section at the other edge. The object-related section specifier 1106 then specifies that each section thus selected as an object-related section for the target object, provided that the following conditions (1E) and (2E) are both satisfied.

(1E) The following three sections all included in the same scene: the non-detected section; one object-detected section in a consecutive relation with the leading or trailing edge of the non-detected section; and another object-detected section in a consecutive relation with the non-detected section at the other edge or a highlight section.

(2E) The duration of the non-detected section is within the predetermined length.

With the video analyzing device according to Embodiment 5, a non-detected section as well as a highlight section can be managed as an object-related section for the target object, provided that the conditions (1E) and (2E) are both satisfied.

Suppose, for example, that a video of children playing soccer is recorded and that the video includes in order a sequence of images representing a child shooting a goal and a sequence of images representing the ball hitting the goal net. In this example, as long as the sequence of images representing the ball hitting the goal is detected as a highlight section, the highlight section and the sequence of images representing the child shooting a goal are managed as one object-related section for the child, despite that the child is not detected at all in the highlight section. In another example, suppose that a video of fireworks display is recorded and that the video includes in order a sequence of images representing a specific person and a sequence of images representing a fireworks display going up into the sky. In this case, the two sequences of images are managed as one object-related section for the person, despite that the person is not detected at all in the sequence of images representing the fireworks display.

In the above manner, sections related to a specific object are dully managed. Therefore, when extracting sections related to a specific object, the user can extract object-detected sections in which the specific object is detected and also extract a non-detected section in a consecutive relation with an object-detected section and a highlight section assumed to related to the specific object. This ensures that a video composed of the extracted sections is a desirable one for the user to watch.

<Modifications>

Up to this point, the video analyzing devices according to embodiments of the present invention have been described. However, the present invention is not limited to the specific embodiments described above. Without departing from the gist of the present invention, various modifications of the embodiments and any combination of components described in the embodiments can be made and still fall within the scope of the present invention.

In the video analyzing device according to each embodiment described above, the object-related section specifier examines a non-detected section, which is a video section in which a target object is not detected, and the two object-detected sections, each of which is a video section in which the target object is detected, in a consecutive relation with the non-detected section. In this way, not only the object-detected sections but also the non-detected section can be specified as an object-related section for the target object. However, the video analyzing device of any of the embodiments described above is not limited to this. For example, one non-detected section and one object-detected section in a consecutive relation with the leading or trailing edge of the non-detected section may be examined to specify an object-related section. The following describes such an example.

Suppose, for example, that the video acquired in Step S201 includes a non-detected section composed of one or more frames in which a target object is not detected and that the start frame of the non-detected section coincides with the start frame of a scene. In this case, the non-detected section is specified as an object-related section for the target object, provided that the following conditions (1F) through (3F) are all satisfied.

(1F) The non-detected section and the object-detected section immediately following the non-detected section in time sequence are both included in the same scene.

(2F) The target object detected in the start frame of the object-detected section that immediately follows the non-detected section satisfies at least one of the limit conditions determined to define the limits of the detectable range of the object. The limit conditions are determined to define the limits of a range in which the target object is detectable. Examples of the limit conditions include that: the target object detected in the start frame is located in a predetermined region of that frame; the orientation of the target object is within a predetermined range; the size of the target object is within a predetermined range; and so on.

(3F) The duration of the non-detected section is within the predetermined length.

A specific description is given with reference to FIGS. 4 and 5. In the following, an example of specifying an object-related section for object 1 is described. In this example, the predetermined length mentioned above corresponds to 10 frames. In addition, the limit condition set for detectable objects includes the limit value for the "orientation" of human face. In particular, the limit value is "30 degrees of rotation on the respective rotation axes shown in FIG. 7".

With reference to FIG. 5, the start frame of scene 1 is frame 0. With reference to FIG. 4, a section composed of a sequence of frames 0-3 is a non-detected section in which object 1 not detected. In this case, the object-related section specifier 106 specifies the non-detected section composed of a sequence of frames from 0-3 as an object-related section, provided that the conditions (1F) through (3F) are all satisfied.

First, with respect to the condition (1F), a sequence of frames 0-3 is a non-detected section in which object 1 is not detected, and a sequence of frames 4-55 is an object-detected section 1 in which object 1 is detected and which immediately follows the non-detected section. That is, object-detected section 1 is included in scene 1 composed of a sequence of frames 0-182. With respect to the condition (2F), the rotation of object 1 detected in the start frame of object-detected section 1 (in frame 4) corresponds to the limit value (30 degrees to the left). Lastly, with reference to the condition (3F), the sequence of frames 0-3 is composed of four frames. That is, the duration of the non-detected section is shorter than the predetermined length, which corresponds to ten frames. Accordingly, the non-detected section composed of frames 0-3 is specified as a section related to object 1. Therefore, the object-related section specifier 106 specifies a sequence of frames from frame 0 to the end frame of object-detected section 1 (to frame 55) as one object-related section for object 1.

Note that the video acquired in Step S201 may include a non-detected section composed of one or more frames in which the target object is not detected, and the end frame of the non-detected section coincides with the end frame of a scene. Also in this case, the non-detected section may be specified as an object related to the target object, provided that the following conditions (1G) through (3G) are all satisfied.

(1G) The non-detected section and the object-detected section immediately preceding the non-detected section in time sequence are both included in the same scene.

(2G) The target object detected in the end frame of the object-detected section immediately preceding the non-detected section satisfies at least one of the limit conditions determined to define the limits of the detectable range of the object. The limit conditions are determined to define the limits of a range in which the target object is detectable. Examples of the limit conditions include that: the target object detected in the end frame is located in a predetermined region of that frame; the orientation of the target object is within a predetermined range; the size of the target object is within a predetermined range; and so on.

(3G) The duration of the non-detected section is within the predetermined length.

In Embodiments 1-4 above, the video analyzing device is first described to detect objects (S202), then tracks (S203) and identifies (S204) the objects, and finally detects scene boundaries in the video (S205). However, the scene boundary detection (S205) may be performed any time before the process of specifying object-related sections (S206, S206A-S206E). For example, the scene boundary detection may be performed between any of the two steps out of the steps of object detection, tracking, and identification processes (S202-S204) or before all of these steps.

In Embodiment 5 above, the video analyzing device 1000 is described to first detect objects (S202), then tracks (S203) and identifies (S204) the objects, and finally detects scene boundaries in the video (S205), followed by the highlight section detection (S1501). However, similarly to the scene boundary detection (S205), the highlight section detection (S155) may be performed any time before the process of specifying object-related sections (S206, S206A-S206E). For example, the scene boundary detection may be performed between any of the two steps out of the steps of object detection, tracking, identification processes, and scene boundary detestation (S202-S205) or before all of these steps.

In each embodiment above, the video analyzing device is described to refer to scene information when extracting sections in Step S601 (or Step S1601). However, this is merely an example and without limitations. For example, Step S601 (or Step S1601) may be modified to first extract sections (and highlight sections) in which an object having the same ID is detected. Then, Step S608 is also modified to ultimately determine sections related to the respective objects with reference to the scene information in the video.

In each embodiment above, the video analyzing device is described to have an object tracker. However, the video analyzing device may be omitted. When the object tracker is not provided, the object identifier may be modified to identify objects detected from the respective frames by the object detector. In this modification, in addition, the object-related section specifier 106 may refer to the information regarding detection and identification of objects as well as the scene boundary information (and also the highlight section in the case of the object-related section specifier according to Embodiment 5) to specify sections related to the respective objects appearing in the video.

In each embodiment above, the processing performed by the video analyzing device to specify object-related sections is not limited to Steps S206 and S206A-S206E described above. A combination of these steps may be used to specify object-related sections.

In each Embodiments 1-4 above, the video analyzing device is described to include the object detector 102, the object tracker 103, the object identifier 104, and the scene detector 105. In addition, the object-related section specifier 106 refers to the information regarding detection, tracking, and identification as well as the scene boundary information to specify object-related sections for the respective objects appearing in the video (S206 and S206A-S206D). The former information is generated in the steps of object detection (S202), object tracking (S203), and object identification (S204), and the latter information is generated in the step of scene boundary detection (S205). However, the video analyzing device according to any of the embodiments above is not limited to this. For example, the information regarding object detection, tracking, and identification as well as the scene boundary information used by the object-related section specifier 106 may be attached to the video by an external device in Step S206 and S206A-S206D.

In Embodiment 5 above, the video analyzing device 1000 is described to include the highlight detector 1401, and the object-related section specifier 1106 is described to refer to: the information regarding object detection, tracking, and identification; the scene boundary information; and also the highlight section information obtained in the step of highlight section detection (S1501) to specify object-related sections for the respective objects appearing in the video (S206E). However, the video analyzing device 1000 according to Embodiment 5 above is not limited to this. For example, the highlight section information used by the object-related section specifier 1106 may be attached to the video by an external device in Step S206E.

One or more or all of the components of the video analyzing device according to any of Embodiments 1-5 may be composed of a single system large scale integration (LSI).

A system LSI is an ultra-multifunctional LSI produced by integrating multiple components on one chip and, more specifically, is a computer system including a microprocessor, read-only memory (ROM), random access memory (RAM), and the like. The ROM stores computer programs. By the microprocessor operating according to the computer programs, the system LSI executes its functionality.

Although the system LSI is specifically referred to here, the terms IC, LSI, super LSI, or ultra LSI are also used depending on the integration density. In addition, the scheme for assembling integrated circuits is not limited to LSI, and a dedicated circuit or a general-purpose processor may be used. A field programmable gate array (FPGA), which allows reprogrammed after the LSI is manufactured, or a reconfigurable processor, which allows reconfiguration of the connection and setting of circuit cells inside the LSI, may be used.

If technology for forming integrated circuits that replaces LSIs emerges, owing to advances in semiconductor technology or to another derivative technology, the integration of functional blocks may naturally be accomplished using such technology. The application of biotechnology or the like is possible.

The present invention may be practiced as a video analyzing device having the characterizing processing units described above and also as a video analyzing method including the steps corresponding to the characterizing processing units of the video analyzing device. The present invention may also be practiced as a computer program causing a computer to execute the characterizing steps of such a method. It goes without saying that such a computer program may be distributed in the form of non-transitory computer-readable recording media typified by CD-ROM, or via a communications network typified by the Internet.

<Supplemental>

The following describes the configuration of a video analyzing devices according to an embodiment of the present invention, along with their modifications and advantageous effects.

A first video analyzing device is for specifying an object-related section from video, the object-related section being related to a specific object appearing in the video. The first video analyzing device includes: an object-related section specifier that specifies a non-detected section as the object-related section when a predetermined condition is satisfied and does not specify the non-detected section as the object-related section when the predetermined condition is not satisfied. The object-detected section is a section in which the specific object is detected. The non-detected section is a section in which the specific object is not detected and which is in a consecutive relation with the object-detected section.

With this configuration, the first video analyzing device can appropriately specify a section related to a specific object appearing in a video.

As a second video analyzing device, the first video analyzing device may be modified such that the predetermined condition is satisfied when the following conditions are both satisfied: the non-detected section and two object-detected sections, one immediately preceding and the other immediately following the non-detected section in time sequence, are all included in one scene; and the specific object detected in an end frame of the preceding object-detected section and the specific object detected in a start frame of the following object-detected section both satisfy at least one of limit conditions that are determined based on detectable limits for the specific object.

With this configuration of the second video analyzing device, when the predetermined condition is satisfied, it can be assumed that the target object is not detected in the non-detected section because: the object actually appearing in the section cannot be detected due to the constraints of the object detection technologies; or the target object was outside the camera frame at the time of video recording as a result of a large motion of the target object per se or of the photographer. Therefore, it is appropriate to specify the non-detected section as belonging to one sequence of sections including the object-detected sections that are in a consecutive relation with the non-detected section.

As a third video analyzing device, the second video analyzing device may be modified such that the limit conditions include that: the specific object detected in the end or start frame of a corresponding one of the object-detected sections is located within a predetermined region of the frame; an orientation of the specific object detected is within a predetermined range; the specific object detected has a size equal to or larger than a threshold A; and the specific object has a size equal to or smaller than a threshold B, the threshold B being smaller than the threshold A.

With this configuration, the third video analyzing device can specify the non-detected section as the object-detected section when the target object detected in each frame that is in a consecutive relation with the non-detected section satisfies one of the limit conditions. The limit conditions include the conditions regarding the frame region in which the target object is detectable, regarding the maximum rotation to which the target object is detectable, and the regarding detectable size of the target object.

As a fourth video analyzing device, the third video analyzing device may be modified such that the predetermined region of the start or end frame is a region near an edge of the frame.

With this configuration, the fourth video analyzing device can determine that the limit conditions regarding the frame region in which the target object is detectable is met when the target object detected in the end or start frame is located near the edge of the frame.

As a fifth video analyzing device, the first video analyzing device may be modified such that the predetermined condition is satisfied when the following conditions are both satisfied: the non-detected section and two object-detected sections, one immediately preceding and the other immediately following the non-detected section in time sequence, are all included in one scene; and motion blur detected in the non-detected section is greater than a predetermined level.

With this configuration, the fifth video analyzing device can specify the non-detected section as the object-detected section when the predetermined condition is satisfied. When the predetermined condition is satisfied, it is assumed that the target object actually appearing in the non-detected section is not debatable due to a large motion blur or the target object was outside the camera frame as a result of a large motion of the photographer.

As a sixth video analyzing device, the first video analyzing device may be modified such that the predetermined condition is satisfied when the following conditions are all satisfied: the non-detected section and two object-detected sections, one immediately preceding and the other immediately following the non-detected section in time sequence, are all included in one scene; an object different from the specific object is detected in the non-detected section; and a duration in which the different object is detected lasts at least a predetermined length or accounts for at least a predetermined percentage of the entire non-detected section.

With this configuration, the sixth video analyzing device can specify the non-detected section as the object-detected section when the predetermined condition is satisfied. When the predetermined condition is satisfied, it is assumed that the target object does not appear in the non-detected section because the photographer intentionally recorded images of an object different from the target object for a while.

As a seventh video analyzing device, the first video analyzing device may be modified such that the predetermined condition is satisfied when the following conditions are all satisfied: the non-detected section and two object-detected sections, one immediately preceding and the other immediately following the non-detected section in time sequence, are all included in one scene; a duration of the non-detected section is within a predetermined length; an object different from the specific object is detected in the non-detected section; and a duration in which the different object is detected lasts at least a predetermined length or accounts for at least a predetermined percentage of the entire non-detected section.

With this configuration, the seventh video analyzing device can specify the non-detected section as the object-detected section when the predetermined condition is satisfied. When the predetermined condition is satisfied, it is assumed that the target object does not appear in the non-detected section because the photographer intentionally recorded images of an object different from the target object for a while.

As an eighth video analyzing device, the first video analyzing device may be modified such that the predetermined condition is satisfied when the following conditions are all satisfied: the non-detected section and two object-detected sections, one immediately preceding and the other immediately following the non-detected section in time sequence, are all included in one scene; an object different from the specific object is detected in each of a plurality of frames constituting the non-detected section; and a region determined by adding a surrounding region to a region bounding the specific object detected in the end frame of the preceding object-detected section overlaps at least partially with a region bounding the other object detected in each frame of the non-detected section and also with a region bounding the specific object detected in the start frame of the following object-detected section.

With this configuration, the eighth video analyzing device can specify the non-detected section as the object-detected section when the predetermined condition is satisfied. When the predetermined condition is satisfied, it is assumed that the target object is occluded by another object that is located between the photographer and the target object.

As a ninth video analyzing device, the eighth video analyzing device may be modified such that the surrounding region is determined based on information regarding at least one of: a size of the specific object detected in the preceding object-detected section; or a displacement of the detected object over at least part of the preceding object-detected section.

With this configuration, the ninth video analyzing device can set the predetermined surrounding region used to detect the target object in accordance with the size of the target object detected in the end frame of the preceding object-detected section or the displacement observed over at least part of the object-detected section (for example, the displacement in the position or size of the detection region bounding the target object).

As a tenth video analyzing device, the first video analyzing device may be modified such that the predetermined condition is satisfied when the following conditions are both satisfied: the non-detected section and two object-detected sections, one immediately preceding and the other immediately following the non-detected section in time sequence, are all included in one scene; and a duration of the non-detected section is within a predetermined length.

With this configuration, the tenth video analyzing device can specify the non-detected section as the object-detected section when the predetermined condition is satisfied. When the predetermined condition is satisfied, the non-detected section is assumed to be a section in which the photographer for some reason did not record images of the target object for a while or a section whose duration is within a predetermined length and thus is short relatively to the duration of the object-detected section(s). Therefore, such a section can be managed as the object-related section without any substantial problems.

As an eleventh video analyzing device, the first video analyzing device may be modified such that the predetermined condition is satisfied when the following conditions are all satisfied: the non-detected section and the object-detected section immediately preceding or immediately following the non-detected section in time sequence are both included in one scene; in the immediately preceding or immediately following object-detected section, the specific object detected in a frame in a consecutive relation with the non-detected section satisfies at least one of limit conditions that are determined based on detectable limits for the specific object; and a duration of the non-detected section is within a predetermined length.

With this configuration, the eleventh video analyzing device can specify the non-detected section as the object-detected section when the predetermined condition is satisfied. When the predetermined condition is satisfied, it is assumed that the target object is not detected in the non-detected section because: the object actually appearing in the section cannot be detected due to the constraints of the object detection technologies; or the target object was outside the camera frame at the time the section was recorded, as a result of a large motion of the target object per se or of the photographer.

As a twelfth video analyzing device, the first video analyzing device may be modified such that the predetermined condition is satisfied when the following conditions are both satisfied: the non-detected section, the object-detected section in a consecutive relation with the non-detected section in time sequence, and one highlight section in a consecutive or overlapping relation with the non-detected section at an boundary at which the consecutive object-detected section is not located are all included in one scene, the highlight section being a section showing an exciting part of the video; and a duration of the non-detected section is within a predetermined length.

With this configuration, the twelfth video analyzing device can specify non-detected sections and/or highlight sections as being in a consecutive relation with a section in which the target object is detected.

A first video analyzing method is for execution by a video analyzing device for specifying an object-related section from video, the object-related section being related to a specific object appearing in the video. The video analyzing method includes: an object-related section specifying step of specifying a non-detected section as the object-related section when a predetermined condition is satisfied and not specifying the non-detected section as the object-related section when the predetermined condition is not satisfied. The object-detected section is a section in which the specific object is detected. The non-detected section is a section in which the specific object is not detected and which is in a consecutive relation with the object-detected section.

With this configuration, the video analyzing method enables the video analyzing device to specify sections related to a specific object appearing in a video.

A first program is for causing a computer to execute a video analyzing processing to act as a video analyzing device for specifying an object-related section from video, the object-related section being related to a specific object appearing in the video. The video analyzing processing includes: an object-related section specifying step of specifying a non-detected section as the object-related section when a predetermined condition is satisfied and not specifying the non-detected section as the object-related section when the predetermined condition is not satisfied. The object-detected section is a section in which the specific object is detected. The non-detected section is a section in which the specific object is not detected and which is in a consecutive relation with the object-detected section.

With this configuration, the video analyzing method enables the video analyzing device to specify sections related to a specific object appearing in a video.

A first integrated circuit is for specifying an object-related section from video, the object-related section being related to a specific object appearing in the video. The integrated circuit includes: an object-related section specifying module that specifies a non-detected section as the object-related section when a predetermined condition is satisfied and does not specify the non-detected section as the object-related section when the predetermined condition is not satisfied. The object-detected section is a section in which the specific object is detected. The non-detected section is a section in which the specific object is not detected and which is in a consecutive relation with the object-detected section.

With this configuration, the first integrated circuit can appropriately specify video sections related to a specific object.

INDUSTRIAL APPLICABILITY

A video analyzing device according to the present invention is applicable to: devices storing videos; image capturing devices such as digital cameras and camera-equipped mobile phones, movie cameras; personal computers (PCs); and so on.

REFERENCE SIGNS LIST 100, 1000 video analyzing device
101 video acquirer
102 object detector
103 object tracker
104 object identifier
105 scene detector
106, 1106 object-related section specifier
120 video shooting device
130 display device
301 acquired video
302 t-th frame
303 (t+1)th frame
304, 305 object identifier
1401 highlight detector

The invention claimed is:
1. A video analyzing device for specifying an object-related section related to an object from a video, the video analyzing device comprising:
 a processor; and
 a non-transitory computer-readable medium having stored thereon executable instructions that, when executed by the processor, makes the video analyzing device function as:
 an object tracker that specifies, in the video, a first detected section in which the object is detected, a non-detected section in which the object is not detected that is temporally consecutive with and subsequent to the first detected section, and a second detected section in which the object is detected that is temporally consecutive with and subsequent to the non-detected section;
 an object-related section specifier that, when the object is detected in a predefined region of an end frame of the first detected section and a start frame of the second detected section, determines that the non-detected section is a section in which the object is temporarily out of frame and specifies a section from a start frame of the first detected section to an end frame of the second detected section as the object-related section; and an object-related section playback unit that extracts the object-related section from the video and plays back the object-related section.

2. The video analyzing device according to claim 1, wherein the predefined region is a region bordering the end frame and the start frame.

3. A video analyzing device for specifying an object-related section related to an object from a video, the video analyzing device comprising:

a processor; and a non-transitory computer-readable medium having stored thereon executable instructions that, when executed by the processor, makes the video analyzing device function as:

an object tracker that specifies, in the video, a first detected section in which the object is detected, a non-detected section in which the object is not detected that is temporally consecutive with and subsequent to the first detected section, and a second detected section in which the object is detected that is temporally consecutive with and subsequent to the non-detected section;

an object-related section specifier that, when an orientation of the object is in a predefined range and a size of the object is equal to or greater than a predefined threshold in an end frame of the first detected section and a start frame of the second detected section, determines that the non-detected section is a section in which the object is a target of video capture and specifies a section from a start frame of the first detected section to an end frame of the second detected section as the object-related section; and an object-related section playback unit that extracts the object-related section from the video and plays back the object-related section.

4. A video analyzing device for specifying an object-related section related to an object from a video, the video analyzing device comprising:

a processor; and a non-transitory computer-readable medium having stored thereon executable instructions that, when executed by the processor, makes the video analyzing device function as:

an object tracker that specifies, in the video, a first detected section in which the object is detected, a non-detected section in which the object is not detected that is temporally consecutive with and subsequent to the first detected section, and a second detected section in which the object is detected that is temporally consecutive with and subsequent to the non-detected section;

an object-related section specifier that, when motion blur is greater than a predefined level in the non-detected section, determines that the non-detected section is a section in which the object is a target of video capture and specifies a section from a start frame of the first detected section to an end frame of the second detected section as the object-related section; and an object-related section playback unit that extracts the object-related section from the video and plays back the object-related section.

* * * * *